United States Patent
Toosky et al.

(10) Patent No.: US 7,802,952 B2
(45) Date of Patent: *Sep. 28, 2010

(54) NUT PLATE FASTENER ASSEMBLY FOR HARD METAL MATERIALS

(75) Inventors: Rahmatollah Fakhri Toosky, San Clemente, CA (US); Soheil Eshraghi, Irvine, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/969,287

(22) Filed: Jan. 4, 2008

(65) Prior Publication Data

US 2008/0101888 A1 May 1, 2008

Related U.S. Application Data

(63) Continuation-in-part of application No. 11/874,347, filed on Oct. 18, 2007, now Pat. No. 7,575,404.

(60) Provisional application No. 60/863,828, filed on Nov. 1, 2006.

(51) Int. Cl.
*F16B 39/28* (2006.01)

(52) U.S. Cl. .................. 411/113; 411/969; 411/501

(58) Field of Classification Search ......... 411/111–113, 411/969, 69, 501; 29/507, 523
See application file for complete search history.

(56) References Cited

U.S. PATENT DOCUMENTS

| | | | |
|---|---|---|---|
| 177,665 A | 5/1876 | Smith | |
| 1,107,544 A | 8/1914 | Ogden | |
| 1,138,345 A | 5/1915 | Zifferer | |
| 1,409,606 A | * 3/1922 | Stendahl | 411/353 |
| 1,413,998 A | 4/1922 | Templeton | |
| 1,966,835 A | 7/1934 | Stites | |
| 2,078,411 A | 4/1937 | Richardson | |
| 2,146,461 A | 2/1939 | Bettington | |

(Continued)

FOREIGN PATENT DOCUMENTS

CH 277209 8/1951

(Continued)

OTHER PUBLICATIONS

Aerospace Fasteners Numerical Listing of Parts 1995 Edition 21 pages.

(Continued)

*Primary Examiner*—Flemming Saether
(74) *Attorney, Agent, or Firm*—Clark Hill PLC

(57) ABSTRACT

A rivetless nut plate assembly, which is fully preassembled, which can be installed into an aperture of a hard metal material workpiece having a hardness of at least 25 Rc, such as Titanium and Steel Alloys. The rivetless nut plate assembly includes a nut, a holding bracket, a retainer, and a sleeve member. Additionally, a stem is used to install the rivetless nut plate assembly. The sleeve member is configured such that the nut plate assembly can be installed in a hard metal material workpiece. The sleeve member may be formed of a high strength, but ductile material, such as Titanium Columbium, Monel, soft Nickel alloys or soft Titanium alloys.

5 Claims, 26 Drawing Sheets

U.S. PATENT DOCUMENTS

| | | | |
|---|---|---|---|
| 2,150,361 A | 3/1939 | Chobert | |
| 2,249,923 A | 7/1941 | Whitcombe | |
| 2,304,107 A | 12/1942 | Leisure | |
| 2,333,386 A | 11/1943 | Murphy | |
| 2,366,956 A | 1/1945 | Clausen | |
| 2,366,965 A | 1/1945 | Johnson | |
| 2,410,398 A * | 10/1946 | Williams, Jr. et al. | 411/501 |
| 2,413,669 A | 12/1946 | Whitcombe | |
| 2,421,201 A | 5/1947 | Hallock | |
| 2,438,044 A | 3/1948 | Freesz | |
| 2,477,429 A | 7/1949 | Swanstrom et al. | |
| 2,560,961 A | 7/1951 | Knohl | |
| 2,649,883 A | 8/1953 | Sharp | |
| 2,802,503 A | 8/1957 | Zupa | |
| 2,825,380 A | 3/1958 | Reiner | |
| 2,976,080 A | 3/1961 | Moore | |
| 2,986,188 A | 5/1961 | Karp et al. | |
| 3,025,897 A | 3/1962 | Gieleghem | |
| 3,126,039 A | 3/1964 | Fiddler | |
| 3,177,916 A | 4/1965 | Rosan | |
| 3,180,387 A | 4/1965 | Dzus et al. | |
| 3,252,493 A * | 5/1966 | Smith | 411/108 |
| 3,305,987 A | 2/1967 | Weaver | |
| 3,316,953 A | 5/1967 | Fransson et al. | |
| 3,537,499 A | 11/1970 | Day et al. | |
| 3,556,570 A | 1/1971 | Cosenza | |
| 3,566,662 A | 3/1971 | Champoux | |
| 3,657,957 A | 4/1972 | Siebol | |
| 3,670,796 A | 6/1972 | Grimm | |
| 3,695,324 A | 10/1972 | Gulistan | |
| 3,698,278 A | 10/1972 | Trembley | |
| 3,765,078 A | 10/1973 | Gulistan | |
| 3,785,421 A | 1/1974 | Launay | |
| 3,825,146 A | 7/1974 | Hirmann | |
| 4,010,519 A * | 3/1977 | Worthing | 403/404 |
| 4,015,650 A | 4/1977 | Anderson | |
| 4,164,807 A | 8/1979 | King, Jr. | |
| 4,186,787 A | 2/1980 | Husain | |
| 4,187,708 A | 2/1980 | Champoux | |
| 4,193,435 A | 3/1980 | Charles et al. | |
| 4,221,041 A | 9/1980 | Hufnagl et al. | |
| 4,227,561 A | 10/1980 | Molina | |
| 4,295,766 A | 10/1981 | Shaw | |
| 4,329,768 A | 5/1982 | Tranberg et al. | |
| 4,405,256 A | 9/1983 | King, Jr. | |
| 4,423,619 A | 1/1984 | Champoux | |
| 4,425,780 A | 1/1984 | Champoux | |
| 4,471,643 A | 9/1984 | Champoux et al. | |
| 4,557,033 A | 12/1985 | Champoux | |
| 4,557,650 A | 12/1985 | Molina | |
| 4,695,212 A | 9/1987 | Berecz | |
| 4,732,518 A | 3/1988 | Toosky | |
| 4,762,451 A | 8/1988 | Collins | |
| 4,768,907 A | 9/1988 | Gauron | |
| 4,781,501 A | 11/1988 | Jeal et al. | |
| 4,790,701 A | 12/1988 | Baubles | |
| 4,826,374 A | 5/1989 | Baglin | |
| 4,828,440 A | 5/1989 | Anderson et al. | |
| 4,830,557 A | 5/1989 | Harris et al. | |
| 4,863,327 A | 9/1989 | Poupiter | |
| 4,875,816 A | 10/1989 | Peterson | |
| 4,884,420 A | 12/1989 | Finkel et al. | |
| 4,885,829 A | 12/1989 | Landy | |
| 4,895,484 A | 1/1990 | Wilcox | |
| 4,934,170 A | 6/1990 | Easterbrook et al. | |
| 4,934,886 A | 6/1990 | Aikens | |
| 4,977,663 A * | 12/1990 | Hurd | 29/525.04 |
| 5,066,180 A | 11/1991 | Lang et al. | |
| 5,078,294 A | 1/1992 | Staubli | |
| 5,083,363 A | 1/1992 | Ransom et al. | |
| 5,096,349 A | 3/1992 | Landy et al. | |
| 5,096,350 A | 3/1992 | Peterson | |
| 5,103,548 A | 4/1992 | Reid et al. | |
| 5,127,254 A | 7/1992 | Copple et al. | |
| 5,146,668 A | 9/1992 | Gulistan | |
| 5,193,643 A | 3/1993 | McIntyre | |
| 5,245,743 A | 9/1993 | Landy et al. | |
| 5,305,627 A | 4/1994 | Quincey et al. | |
| 5,341,559 A | 8/1994 | Reid et al. | |
| 5,380,136 A | 1/1995 | Copple et al. | |
| 5,405,228 A | 4/1995 | Reid et al. | |
| 5,433,100 A | 7/1995 | Easterbrook et al. | |
| 5,468,104 A | 11/1995 | Reid et al. | |
| 5,630,686 A | 5/1997 | Billmann | |
| 5,704,747 A | 1/1998 | Hutter, III et al. | |
| 5,716,178 A | 2/1998 | Vu | |
| 5,730,540 A * | 3/1998 | Duran et al. | 403/21 |
| 5,893,694 A | 4/1999 | Wilusz et al. | |
| 5,947,518 A | 9/1999 | Redman et al. | |
| 6,077,010 A | 6/2000 | Reid et al. | |
| 6,146,071 A | 11/2000 | Norkus et al. | |
| 6,183,180 B1 | 2/2001 | Copple et al. | |
| 6,439,816 B1 | 8/2002 | Nance et al. | |
| 7,059,816 B2 | 6/2006 | Toosky | |
| 7,100,264 B2 * | 9/2006 | Skinner et al. | 29/523 |
| 7,114,900 B2 | 10/2006 | Toosky | |

FOREIGN PATENT DOCUMENTS

FR    2740184    4/1997

OTHER PUBLICATIONS

Fatigue Improvement by Sleeve Coldworking by Joseph L. Phillips, Oct. 1973—13 pages.

* cited by examiner

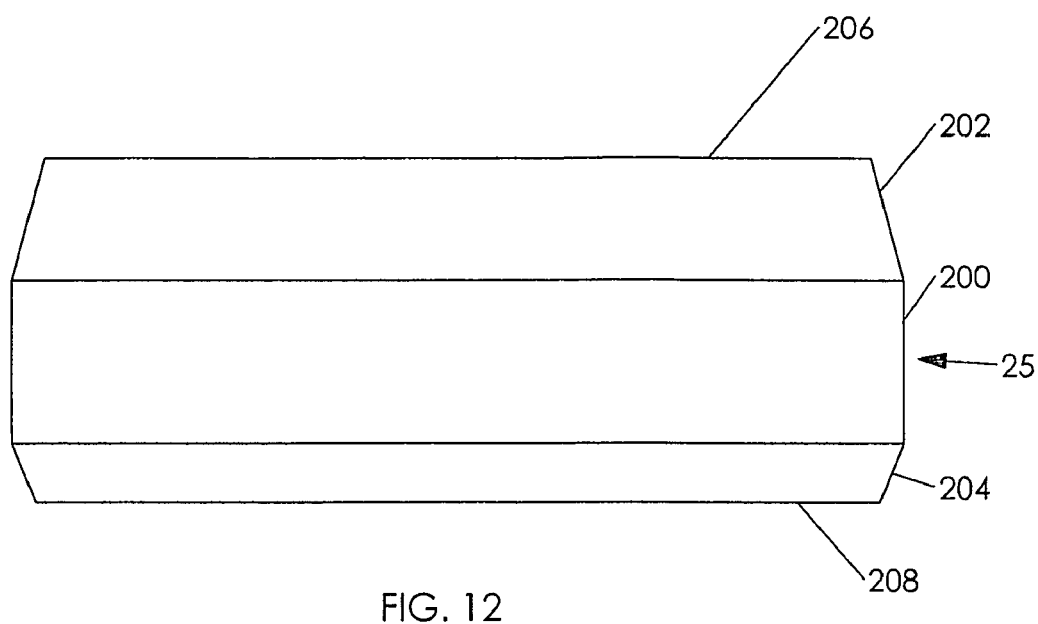
FIG. 12
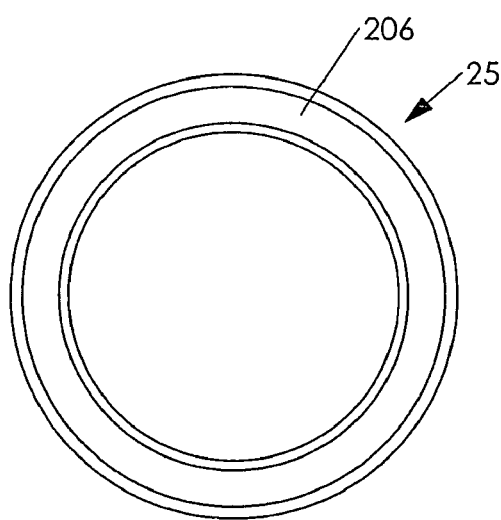 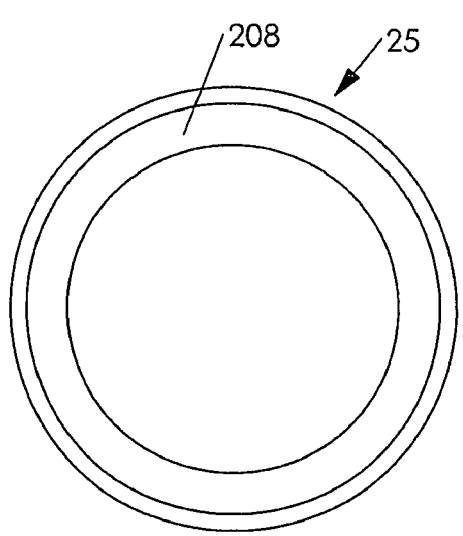
FIG. 13          FIG. 14

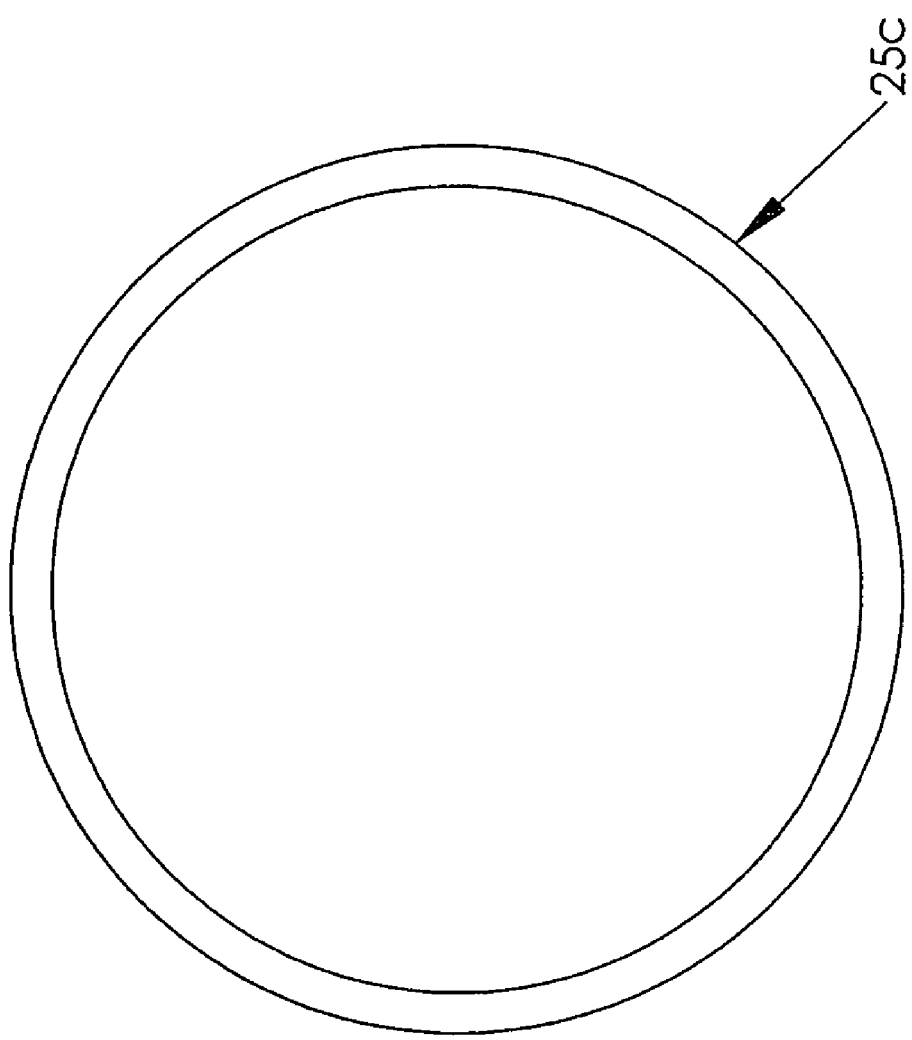

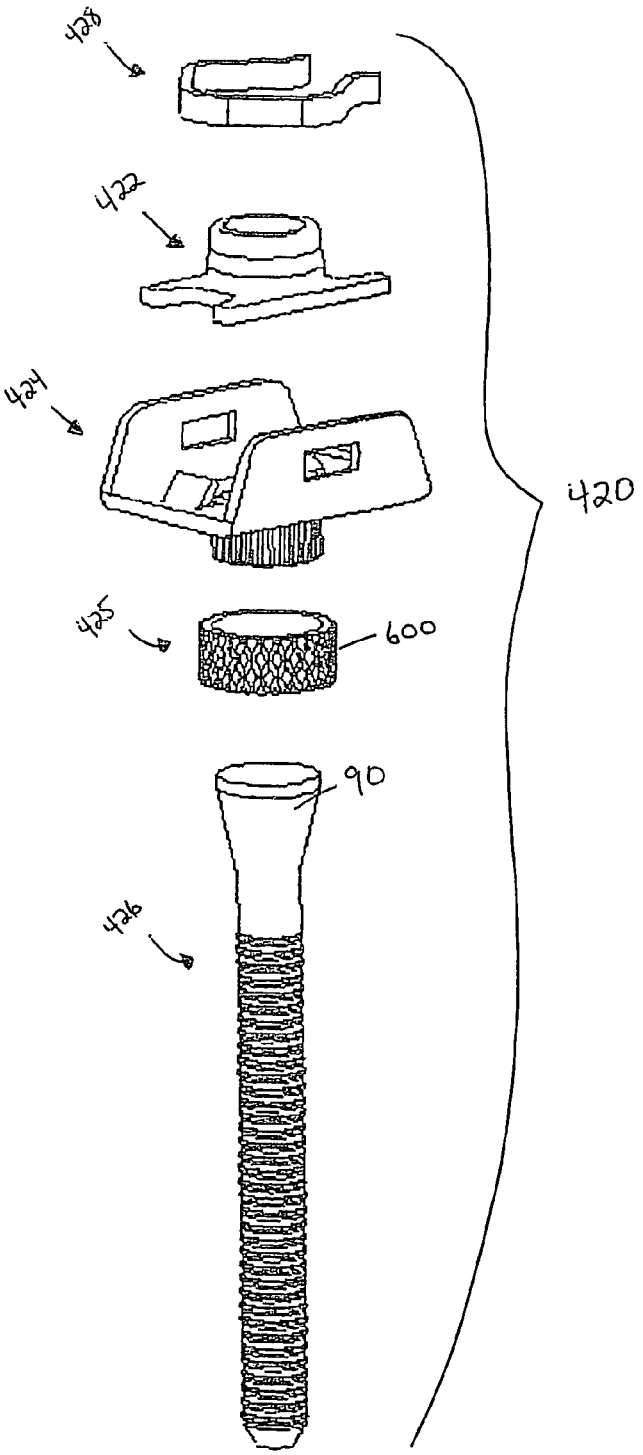

NUT PLATE FASTENER ASSEMBLY FOR HARD METAL MATERIALS

RELATED APPLICATION

Priority Claim

This application is a continuation-in-part of U.S. patent application Ser. No. 11/874,347, filed Oct. 18, 2007, and entitled "Nut Plate Fastener Assembly For Composite Materials". U.S. patent application Ser. No. 11/874,347, in turn, claims the benefit of U.S. Provisional Application Ser. No. 60/863,828, filed Nov. 1, 2006, and entitled "Nut Plate Fastener Assembly For Composite Materials". U.S. patent application Ser. No. 11/874,347 and U.S. Provisional Patent Application No. 60/863,828 are hereby incorporated herein by reference in their entireties.

BACKGROUND OF THE INVENTION

The present invention generally relates to nut plate fastener assemblies, and more specifically relates to a rivetless nut plate fastener assembly which is configured for use with a composite material workpiece and a rivetless nut plate fastener assembly which is configured for use with a hard metal material workpiece.

Fasteners are used in the aerospace industry for securing at least two workpieces together. Fasteners used in such installations may include a nut plate and a nut which are part of an assembly. There are many different design configurations of nut plates being used today. Two major classes are riveted nut plates and rivetless nut plates.

In riveted nut plates, two rivets are employed for attaching the body of the nut plate to the workpiece. To eliminate the potential for leakage through the openings of the riveted nut plates, sealant is used between the workpiece and the nut plate.

With regard to rivetless nut plates, some designs provide that a sleeve is flared against a workpiece. One example of this type of rivetless nut plate is disclosed in U.S. Pat. No. 4,732,518, which is hereby incorporated herein by reference in its entirety. The '518 patent illustrates the insertion of a sleeve inside a workpiece against heavy interference forces and then deformation of the sleeve to produce flaring of the end of the sleeve. The sleeve has a serration/lobe configuration thereon with the serration/lobe configuration being long and tapered such that the serrations/lobes extend into the walls of the workpiece. The tapered feature, length and specific geometry are necessary to make installation possible with the method of installation which was chosen for its application. The main object of the '518 patent with its tapered and extended serration/lobe configuration was to enhance the fatigue life of the workpiece by distributing the load throughout the workpiece and providing expansion due to the insertion of the sleeve into the workpiece, and to cold work the material adjacent the perimeter of the workpiece aperture.

Other nut plate designs do not rely on flaring of the sleeve. U.S. Pat. Nos. 5,096,349, 5,245,743, 5,405,228, 7,059,816 and 7,114,900 disclose rivetless nut plate designs which do not rely on flaring of the sleeve, and these five items are hereby incorporated herein by reference in their entirety. While some rivetless nut plate designs rely on adhesive for attaching the nut plate to the structure, the designs disclosed in the five items cited above rely on heavily cold-worked holes and high interference engagement utilizing a hardened pin as the installation tool to expand a sleeve element into engagement with a workpiece structure. Because of high level expansion, the friction forces created are intended to retain the nut plate and provide expected mechanical properties.

Currently within the aerospace industry, the rivetless nut plate disclosed in U.S. Pat. No. 7,059,816 is becoming more and more predominate within aluminum structure applications, taking the place of outdated nut plates utilizing satellite rivets. This is due to the time saving nature of the rivetless nut plate, while still maintaining the mechanical properties for torque out and push out as required by NASM25027.

This rivetless nut plate works by pulling a mandrel through the inside diameter of a nut plate retainer which has been placed in a pre-drilled hole, expanding the fastener sleeve radially in the hole. This radial expansion of the fastener sleeve in the work piece embeds the sleeve with its complex lobe design into the pre-drilled hole and creates the interlocking action between the nut plate and the structure required to resist torque out and push out.

Unfortunately, with composite structures, the introduction of holes in the material and subsequently fasteners in those holes, create unique problems not existing with most aerospace structural materials. Due to the properties of composites, too much radial expansion of the work hole caused by the fastener sleeve leads to delamination of the composite, while too little radial expansion hampers proper shear load transfer. A solution is needed. Thus, the present invention deals with rivetless nut plates for installation in composite structures.

Also unfortunately, with hard metal structures having a hardness of at least 25 Rc, such as Titanium and Steel alloys, the radial expansion of the fastener sleeve does not allow for any embedding process to take place and, thus, does not achieve the required mechanical properties. A solution is needed. Thus, the present invention deals with rivetless nut plates for installation in hard metal structures.

While it seems that there is no current approach to modifying a rivetless nut plate such that it is useable with composite material and/or hard metal workpieces, there is an approach using the outdated nut plate with satellite rivets.

With regard to composite material workpieces, this approach requires drilling and reaming operations for their holes, or it needs to be accompanied with a bonding agent. Due to the nature of composite material, each drilled hole, as well as each additional installed fastener, endangers the integrity of the structure. Performing the drilling process in the composite material is difficult and costly, and can also damage the structure by exposing fibers to water absorption problems, while each installed fastener can damage the composite structure due to overfill conditions. In overfill conditions, the excessive radial expansion of the fastener can lead to delamination of the composite structure. Finally, the integrity of the bonding process is not easily verifiable and it can deteriorate due to environmental changes such as heat, moisture and chemicals.

Thus, an embodiment of the present invention aims to fasten a rivetless nut plate to a composite structure without the use of bonding agents, additional holes or satellite rivets, and without damaging the structure.

With regard to hard metal workpieces, this approach requires three holes by means of drilling, reaming, counterboring, and countersinking, all to precise tolerances. The main disadvantage of the outdated riveted nut plate method is that it is time intensive. The process requires four separate operations (drilling, reaming, counterboring and countersinking) for three separate holes, in order to install one fastener. These holes must also be placed at just the right distance from each other, and in a perfect linear line.

Thus, an embodiment of the present invention aims to fasten a rivetless nut plate to a hard metal structure in a less time intensive manner that does not require the creation of three separate holes to precise tolerances using four separate operations, namely, drilling, reaming, counterboring and countersinking.

OBJECTS AND SUMMARY OF THE INVENTION

An object of an embodiment of the present invention is to provide a rivetless nut plate assembly which can be installed into an aperture of a composite material workpiece without risking delamination of the workpiece.

Another object of an embodiment of the present invention aims to fasten a rivetless nut plate to a composite structure without the use of bonding agents, additional holes or satellite rivets, and without damaging the structure.

Another object of an embodiment of the present invention is to provide a rivetless nut plate assembly which can be installed into an aperture of a hard metal structure without requiring the formation of additional holes in the structure to precise tolerances.

Yet another object of an embodiment of the present invention is to provide a rivetless nut plate assembly which can be installed into hard metal structures such that the mechanical properties of the installed rivetless nut plate conforms with NASM25027 for torque-out and push-out.

Briefly, and in accordance with the foregoing, an embodiment of the present invention provides a rivetless nut plate assembly, which is fully preassembled, which can be installed into an aperture of a composite material workpiece, such as a carbon fiber structure, without risking delamination of the workpiece. The rivetless nut plate assembly includes a nut, a holding bracket, a retainer, and a sleeve member. Additionally, a stem is used to install the rivetless nut plate assembly. The sleeve member is configured such that the nut plate assembly can be installed in a composite material workpiece without risk of delamination. The sleeve member may be formed of 45Cb-55Ti Titanium Columbium, as Titanium Columbium is a high strength and ductile material that resists corrosion in the presence of, for example, a carbon fiber composite structure. Monel, Titanium alloys, and other soft Nickel alloys are also good material selections for the sleeve, for similar reasons. Non-metallic materials with high tensile and shear strengths, such as Torlon or Parmax, would provide the desired corrosion protection and also offer a potential weight savings.

Another embodiment of the present invention provides a rivetless nut plate assembly, which is fully preassembled, which can be installed into an aperture of a hard metal material workpiece having a hardness of at least 25 Rc, such as Titanium and Steel alloys. The rivetless nut plate assembly includes a nut, a holding bracket, a retainer, and a sleeve member. Additionally, a stem is used to install the rivetless nut plate assembly. The sleeve member is configured such that the nut plate assembly can be installed in a hard metal material workpiece. The sleeve member may be formed of a high strength, but ductile material, such as Titanium Columbium, Monel, soft Nickel alloys or soft Titanium alloys.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 12 is a side elevational view of a sleeve component of the nut plate assembly;

FIG. 12b is a top (and bottom) view of the alternative sleeve component shown in FIG. 12a;

FIG. 13 is a top plan view of the sleeve;

FIG. 14 is a bottom plan view of the sleeve;

FIG. 20a is a top (and bottom) view of the alternative sleeve component shown in FIG. 20;

FIG. 21 is an exploded perspective view of a nut plate assembly which is in accordance with an embodiment of the present invention;

FIG. 23a is an enlarged side, cross-sectional view showing the nut plate assembly of FIG. 21 prior to being positioned for installation in a hole in a hard metal material workpiece;

DETAILED DESCRIPTION OF THE ILLUSTRATED EMBODIMENTS

Figure 1:
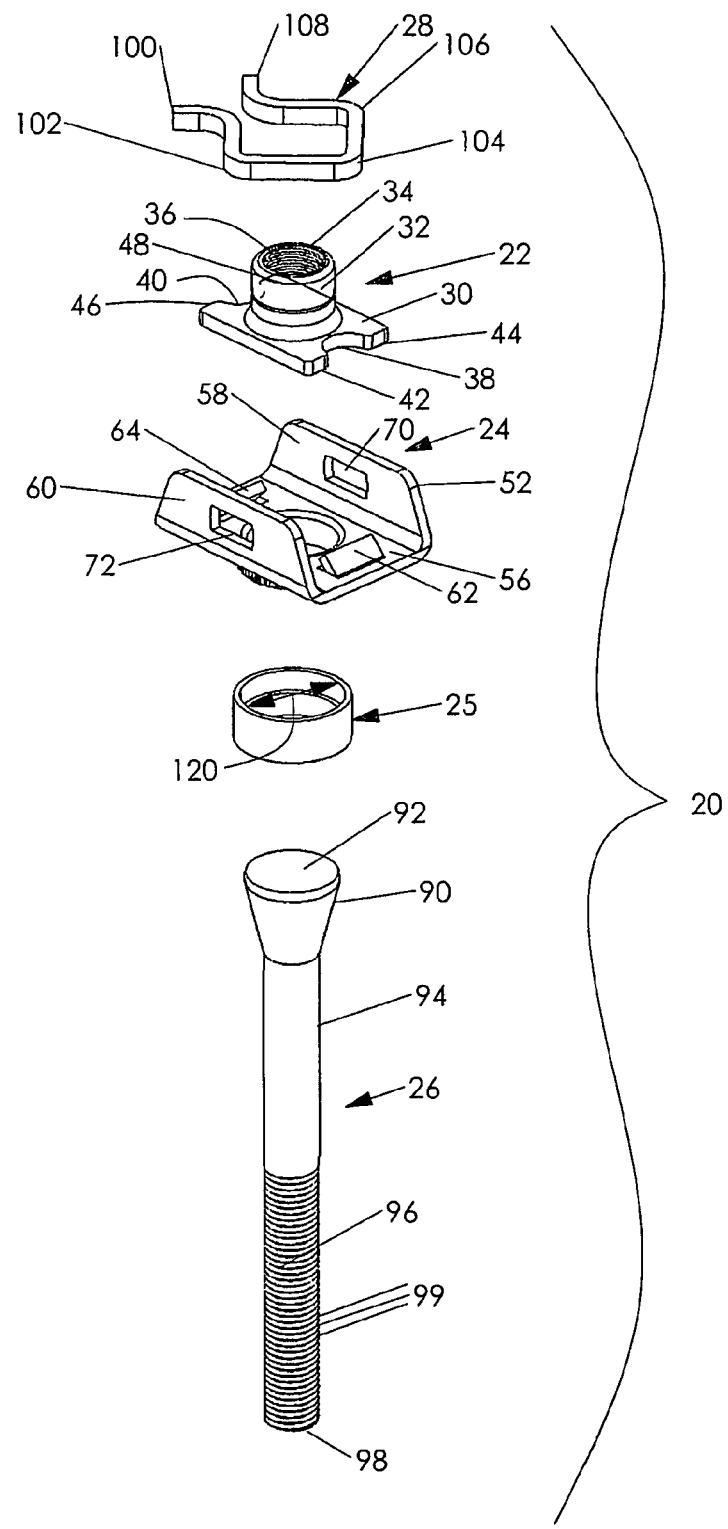
FIG. 1 is an exploded perspective view of a nut plate assembly which is in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 is an exploded perspective view of a rivetless nut plate assembly 20 which is in accordance with an embodiment of the present invention. The rivetless nut plate assembly 20 is configured such that it can be installed into an aperture of a composite material workpiece without risking delamination of the workpiece, and can be installed without having to use bonding agents, additional holes or satellite rivets.

The nut plate assembly 20 includes a nut 22, a holding bracket 24, a sleeve 25 and a retainer 28. Additionally, before installation, the nut plate assembly 20 includes a stem 26 that is used to install the nut plate assembly 20 into an aperture 112 in a composite material workpiece 110.

The nut 22 includes a base portion 30 and a portion 32 which extends upwardly therefrom, which is generally cylindrical in configuration. An aperture 34 is provided through the base portion 30 and the portion 32 which defines an aperture wall 36. The aperture wall 36 is generally threaded such that a fastener, such as a bolt, can be attached thereto. The base portion 30 includes end recesses 38, 40 and axially projecting end portions 42, 44 and 46, 48 situated on opposite sides of the recesses 38, 40, respectively.

As shown in FIGS. 2-9, the holding bracket 24 is generally Y-shaped in front elevation and includes a tubular portion 50 and a bracket portion 52 which extends outwardly from the tubular portion 50 at a first end 54 thereof. The bracket portion 52 includes a base portion 56 and opposed upstanding side walls 58, 60. The base portion 56 has a pair of protrusions 62, 64 which protrude upwardly from the base portion 56. Protrusion 62 is provided proximate to edge 66 of the base portion 56 and protrusion 64 is provided proximate to edge 68 of the base portion 56. Slots 70, 72 extend through the side walls 58, 60 of the bracket portion 52.

Figure 3:
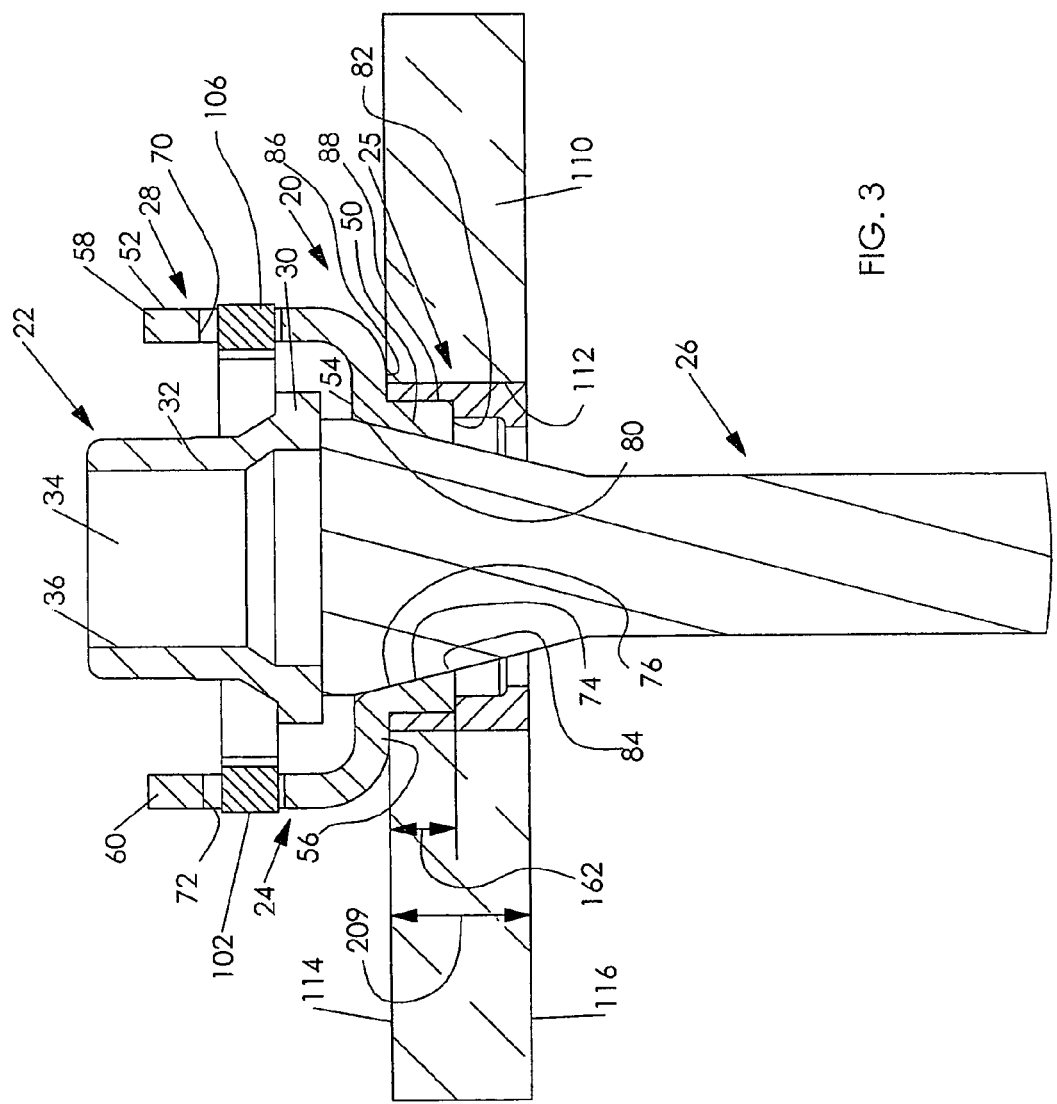
FIG. 3 is similar to FIG. 2, showing a portion thereof enlarged.
Figure 5:
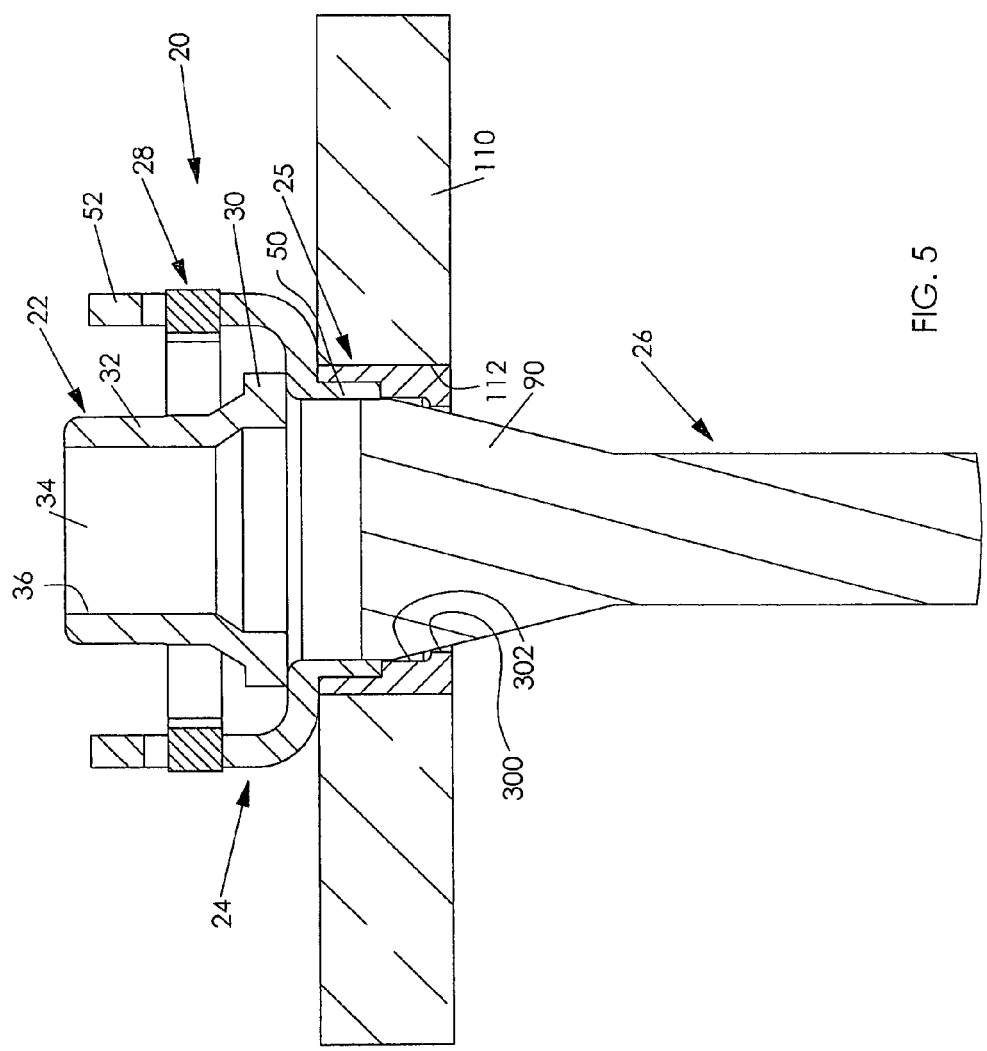
FIG. 5 is similar to FIG. 4, showing a portion thereof enlarged.

The tubular portion 50 extends in the opposite direction from the base portion 56 of the bracket portion 52 than do the side walls 58, 60 and the protrusions 62, 64 of the bracket portion 52. The tubular portion 50 has an aperture 74 therethrough which defines an inner wall 76 of the tubular portion 50. The tubular portion 50 also has an outer wall 78. From the first end 54 of the tubular portion 50, the inner wall 76 preferably curves inwardly to provide a shoulder 80. From the shoulder 80 to a second end 82 of the tubular portion 50, the inner wall 76 is preferably tapered or stepped such that the diameter of the inner wall 76 is gradually reduced, as illustrated in FIG. 5. If desired, the inner wall 76 need not be tapered. Additionally, preferably the inner wall 76 is configured to have a lip 84 provided proximate to the second end 82, as illustrated in FIG. 3, which further reduces the diameter of the inner wall 76. The lip 84 is shown with the inner wall 76 being tapered.

The outer wall 78 of the tubular portion 50 extends from an undersurface 86 of the bracket portion 52 to the second end 82 of the tubular portion 50. Lobes or ribs 88 extend outwardly from the outer wall 78 of the tubular portion 50 if desired, and each lobe or rib 88 may be provided with an upper angled surface 89. The purpose for the lobes/ribs 88 and upper angled surfaces 89 will be discussed further later herein.

Figure 15:
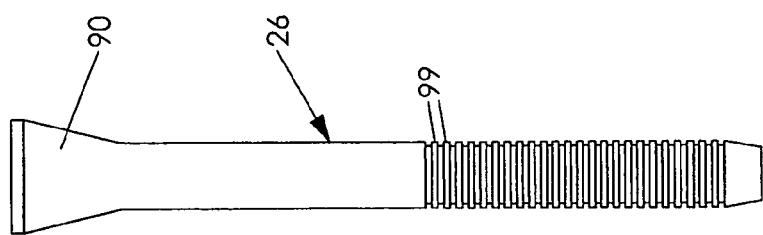

The stem 26 includes an enlarged head portion 90 at a first end 92 thereof and an elongated portion 94, which is preferably cylindrical, which extends from the enlarged head portion 90. The enlarged head portion 90 tapers to the elongated portion 94. The elongated portion 94 has a tool engaging section 96 proximate to a second end 98 of the stem 26, which may include annular lobes 99 (see FIG. 15) for engagement by an appropriate, conventional pulling tool.

The retainer 28 may be a spring formed from rectangular wire bent into the form illustrated. The retainer 28 is preferably one piece and extends from end portion 100, to side portion 102, then to middle portion 104, then to side portion 106, and then to end portion 108. The side portions 102, 106 are configured to insert in the slots 70, 72 which extend through the side walls 58, 60 of the bracket portion 52 of the bracket 24.

The second end 98 of the stem 26 is positioned within the aperture 74 of the tubular portion 50 of the holding bracket 24 at the first end 54 thereof such that the enlarged head portion 90 of the stem 26 rests on the shoulder 80 of the inner wall 76 of the tubular portion 50.

The nut 22 is connected to the holding bracket 24 by the base portion 30 being positioned against the base portion 56 of the bracket portion 52 such that the protrusions 62, 64 on the base portion 56 are positioned within the recesses 38, 40 of the nut 22. When the side portions 102, 106 of the retainer 28 are received in the slots 70, 72 of the bracket portion 52 of the bracket 24, the retainer 28 is attached to the bracket portion 52 to hold the nut 22 within the confines defined by the bracket portion 52 and the retainer 28, but such that the nut 22 is allowed to float in at least one dimension, but preferably in three dimensions, in order to facilitate and permit alignment of a fastener, such as a bolt, with the nut 22.

The rivetless nut plate 20 also includes a sleeve member 25. Preferably, the sleeve member 25 is formed of a material such as 45Cb-55Ti Titanium Columbium, as Titanium Columbium is a high strength and ductile material that resists corrosion in the presence of, for example, a carbon fiber composite structure. Monel, Titanium alloys and other soft Nickel alloys are also good material selections for the sleeve 25, for similar reasons. Non-metallic materials with high tensile and shear strengths, such as Torlon or Parmax, would provide the desired corrosion protection and also offer a potential weight savings. The sleeve 25 allows the installation of the rivetless nut plate assembly 20 into composite structures, such as carbon fiber reinforced polymers (CFRP), in such a way that the mechanical properties of the installed rivetless nut plate conforms with NASM25027 for torque out and push out.

Figure 12A:
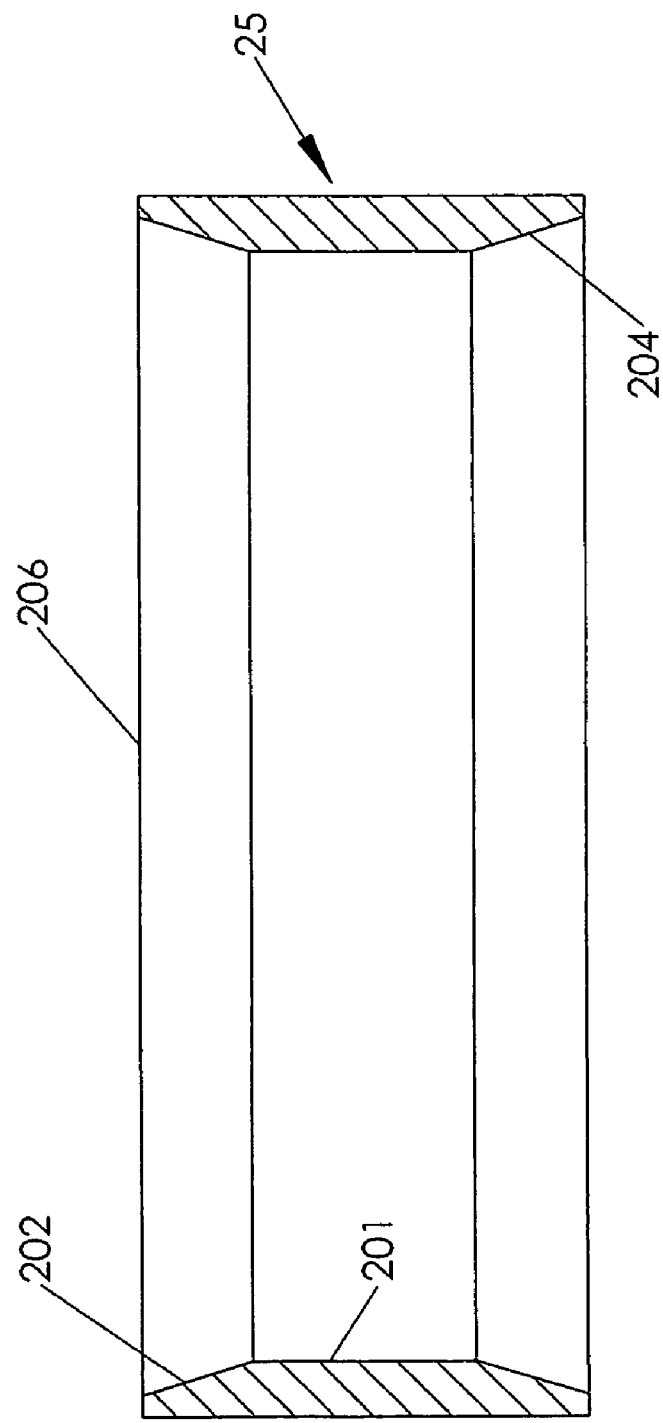
FIG. 12a is a cross-sectional view of an alternative sleeve component configuration which can be utilized in connection with the present invention.
Figure 12B:
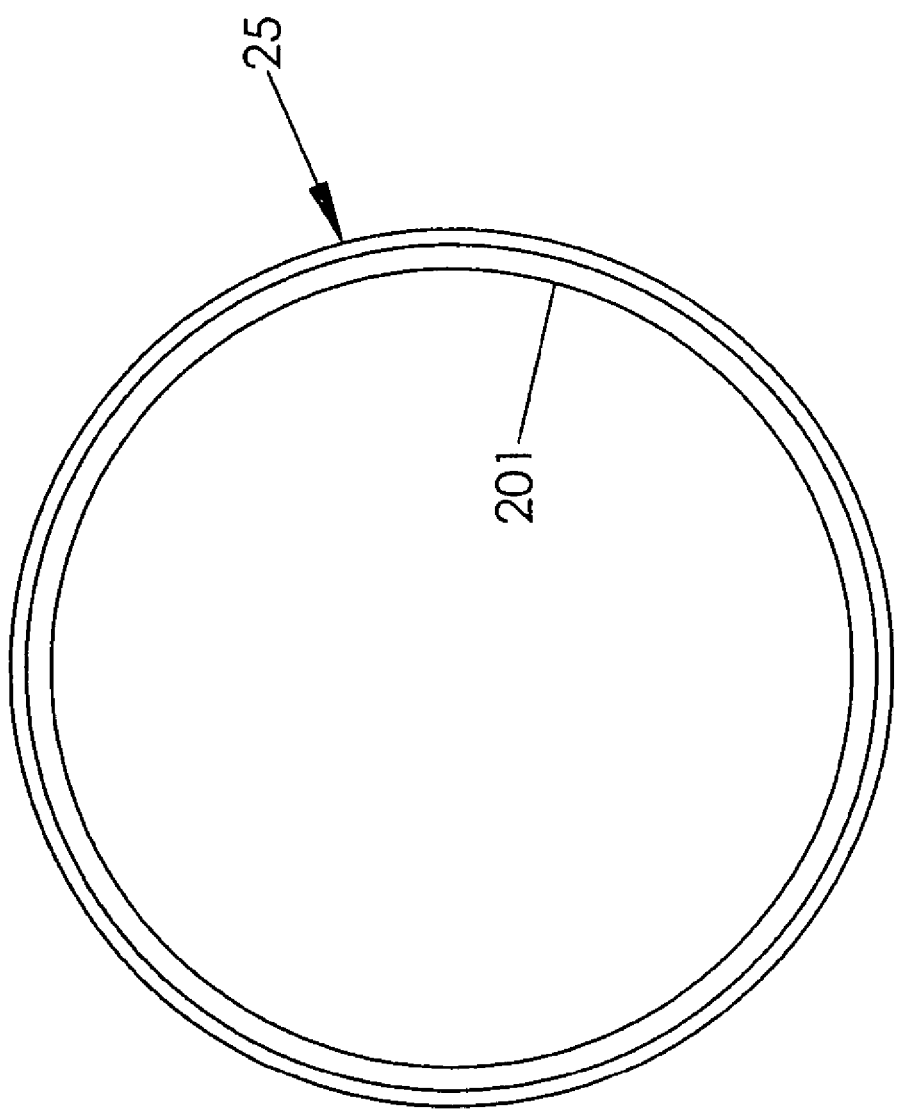

As shown in FIG. 12, preferably the outside surface 200 (or inside surface 201 as shown in FIGS. 12a and 12b) of the sleeve 25 has two chamfers 202, 204 (i.e., radii, fillets, or other types of geometrical impressions)—one chamfer 202 at the top 206 and one chamfer 204 at the bottom 208. These two chamfers 202, 204 allow the sleeve 25 to be used with the rivetless nut plate 20 described hereinabove. The top chamfer 202 is configured such that the sleeve 25 can accommodate the upper angled surfaces 89 of the lobes 88 (see FIG. 8) which protrude from the base 56 of the retainer 28, and the bottom chamfer 204 is configured to effectively function to accommodate a lip 300 which is provided on an inside surface 302 of the sleeve 25. In composite structures, such as a carbon fiber composite, any excessive radial expansion of the composite will cause the structure to delaminate. The chamfers 202, 204 on the sleeve 25 are provided to allow the angled surfaces 89 of the lobes 88 and the lip 300 room to expand within the sleeve 25 instead of within the composite structure, and the result is no delamination.

The outside surface 200 of the sleeve 25 is preferably provided as either being smooth or as having a shallow (i.e. not deep) geometrical pattern impressed into it. Preferably, the sleeve 25 does not have deep lobes and/or ribs around it, because it may cause delamination of the composite structure. Another option in lieu of providing shallow lobes on the outside surface 200 of the sleeve 25 is to mold or spray a non-metallic coating onto the outside surface 200, in order to increase the friction between the composite structure and the sleeve. The increased friction between the composite structure 110 and the sleeve 25 will allow the component to resist greater push out and torque out values. Yet another option is to add an epoxy to the outside surface 200 of the sleeve 25 to create a bond between the sleeve 25 and the composite workpiece structure 110. Although not specifically shown in the FIGURES, the sleeve 25 may include an optional geometry on its outside surface 200, such as a step wherein the outside surface 200 has effectively two outside diameters.

The sleeve member 25 also preferably has a length, defined as a distance from the top 206 of the sleeve 25 to the bottom 208 of the sleeve 25, which is substantially equal to a thickness of the workpiece 110, defined as a distance (dimension 209 in FIG. 3) from the top surface 114 to the bottom surface 116 of the workpiece 110. While the length of the tubular portion 50 of the holding bracket 24 is preferably equal to or less than the thickness of the workpiece 110, the length of the sleeve member 25 is preferably equal to or greater than the length of the tubular portion 50 of the holding bracket 24.

Preferably, the sleeve 25 is shaped such it can be press fit onto the bracket 24, i.e., onto the lobes 88. As such, preferably an inner diameter 120 (see FIG. 1) of the sleeve 25 is less than an outer diameter 122 (see FIG. 8) of the tubular portion 50 of the bracket 24.

In use, a hole or aperture 112 of a standard specified size is drilled into the composite structure 110 at the point where the rivetless nut plate 20 is needed. Then, the sleeve 25 is pressed onto the bracket 24, the stem 26 is positioned such that the head 90 of the stem 26 is in contact with the shoulder 80 of the bracket 24, and the elongated portion 94 extends through the aperture 74 in the tubular portion 50 of the bracket 24. Then, the nut 22 is placed on the bracket 24, and the retainer 28 is used to secure the nut 22 against the bracket 24 and effectively secure the head 90 of the stem 26 in the bracket 24.

Figure 2:
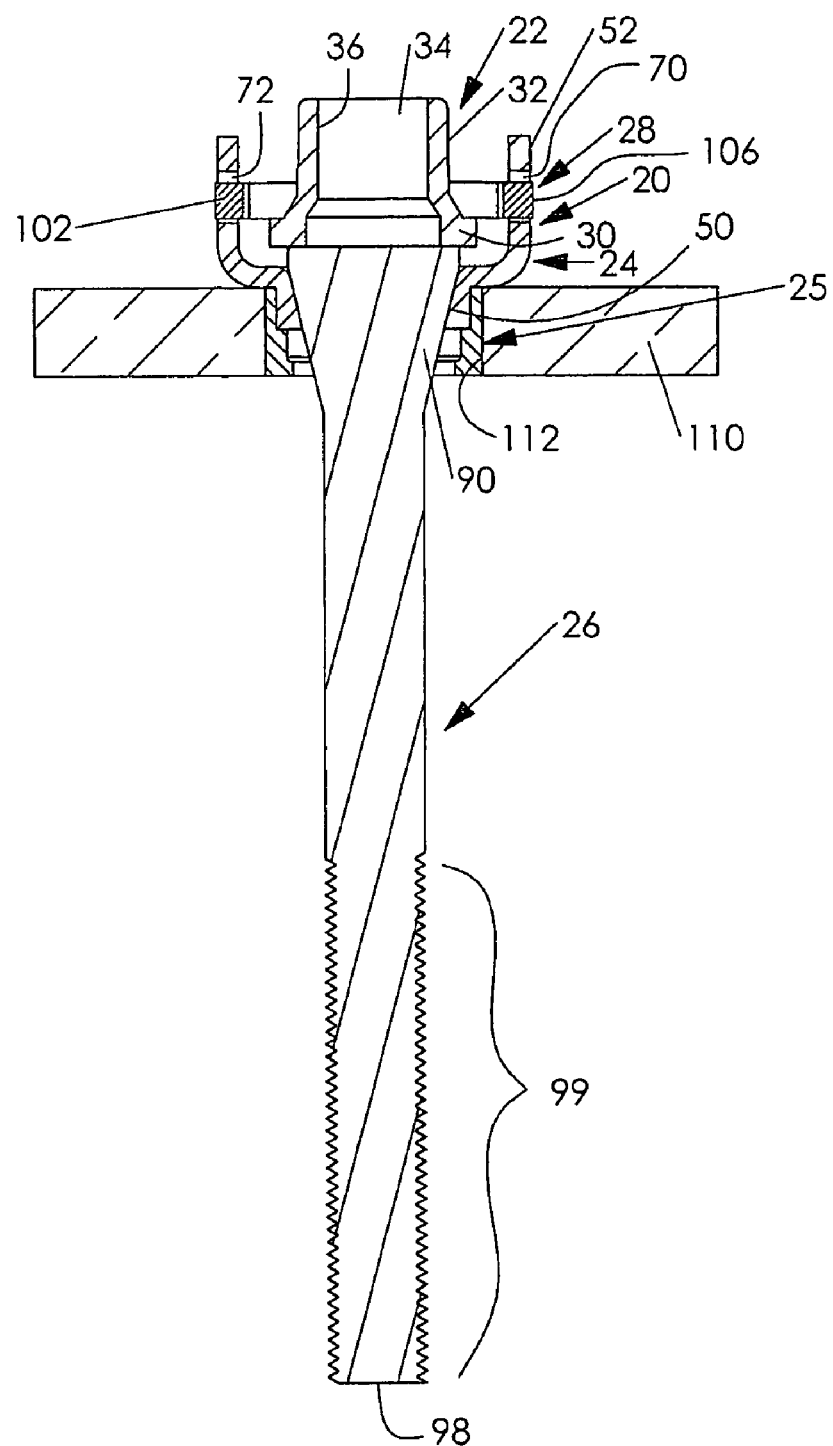
FIG. 2 is a side, cross-sectional view showing the nut plate assembly of FIG. 1 positioned for installation in a hole in a composite material workpiece.

The nut plate assembly 20, in its preassembled form, is then inserted into the aperture 112 of the workpiece 110 by inserting the second end 98 of the stem 26 and the tubular portion 50 of the holding bracket 24 and the sleeve 25 into the aperture 112 of the workpiece 110, such that the undersurface 86 of the bracket portion 52 of the holding bracket 24 sits on the top surface 114 of the workpiece 110, as illustrated in FIGS. 2 and 3. The aperture 112 has a depth (dimension 209 in FIG. 3) which is preferably larger than or equal to the length (dimension 162 in FIG. 3) of the tubular portion 50 of the holding bracket 24 such that the tubular portion 50 does not extend beyond the aperture 112 of the workpiece 110.

Figure 4:
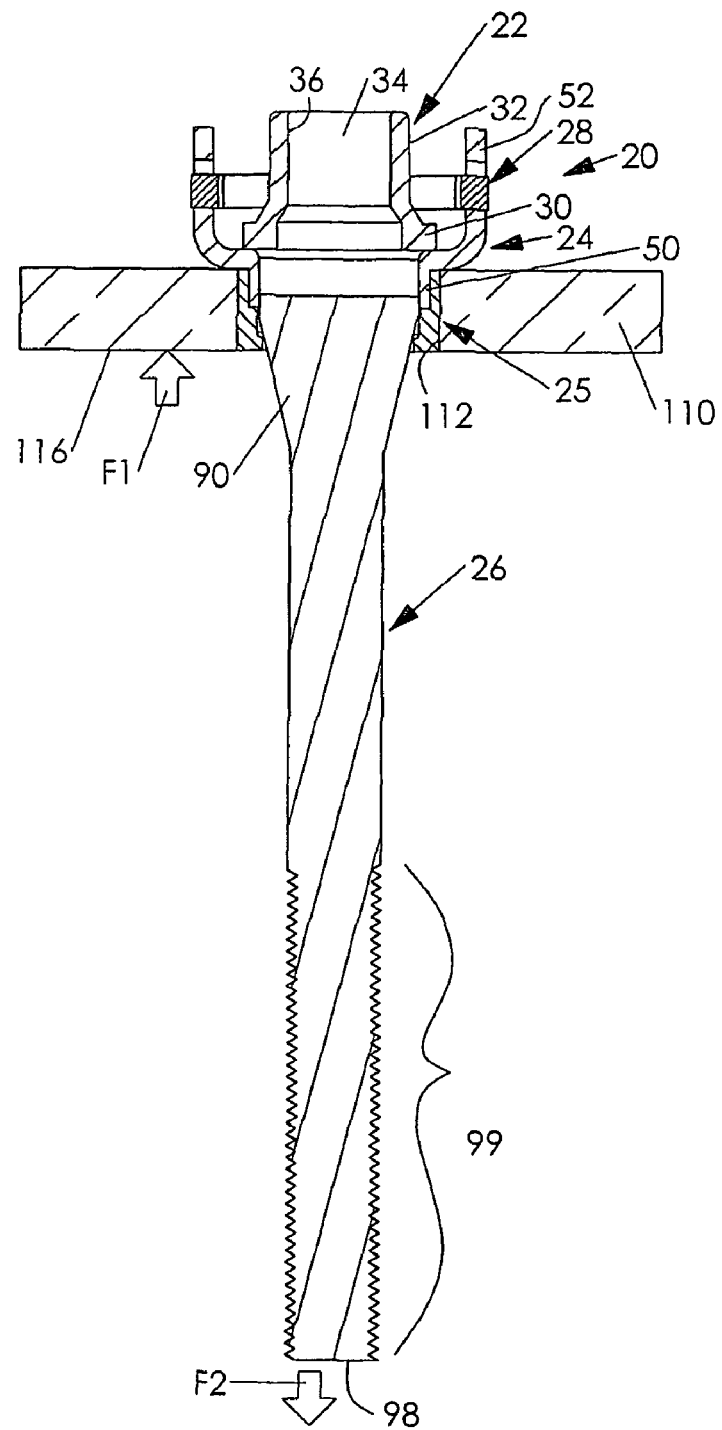
FIG. 4 is a side, cross-sectional view showing a head portion of a stem being pulled through the sleeve of the nut plate assembly.

Through the use of a pulling tool, a holding or abutment force F1 (see FIG. 4) is applied to the bottom surface 116 of the workpiece 110 and the tool engages the tool engaging section 96 of the stem 26 and applies a force F2 (see FIG. 4) to the stem 26 which is directed axially and in the opposite direction than the force F1 is applied to the workpiece 110. The force F2 on the stem 26 seats the tubular portion 50 and the bracket portion 52 of the holding bracket 24 firmly against and within the sleeve 25, as shown in FIGS. 4 and 5.

Through the use of the pulling tool, the head 90 of the stem 26 is pulled through the tubular portion 50 of the bracket 24, expanding both the tubular portion 50 of the bracket 24 and the sleeve 25, creating interference between the bracket 24 and sleeve 25, as well as interference between the sleeve 25 and the composite material workpiece 110. This radial expansion and resulting interference creates the interlocking and interference necessary to obtain the required mechanical properties for the rivetless nut plate 20. The sleeve 25 is pliable to interlock with the tubular portion 50 of the bracket 24 and create the necessary interference load with the composite structure 110 from this radial expansion, while not causing delamination of the composite workpiece structure 110.

The enlarged head portion 90 of the stem 26 initially expands the tubular portion 50 as well as places a compressive load on the components to seat them against the top surface 114 of the workpiece 110. The tubular portion 50 expands to engage the sleeve 25. As this occurs, the head 90 of the stem 26 continuously deforms the tubular portion 50 radially outwardly to engage the sleeve 25 with sufficient force to cause the lobes/ribs 88, or alternate structure, if provided, on the outer wall 78 of the tubular portion 50 to embed in the interior wall 302 of the sleeve 25. As can be appreciated, the increasing wall thickness of the tubular portion 50 insures that radial deformation continues along the entire length of the tubular portion 50 to attain the desired degree of engagement of the lobes/ribs 88 in the wall 302 of the sleeve 25 such that improved push-out, pull-out, torque-out and fatigue characteristics are achieved.

Figure 6:
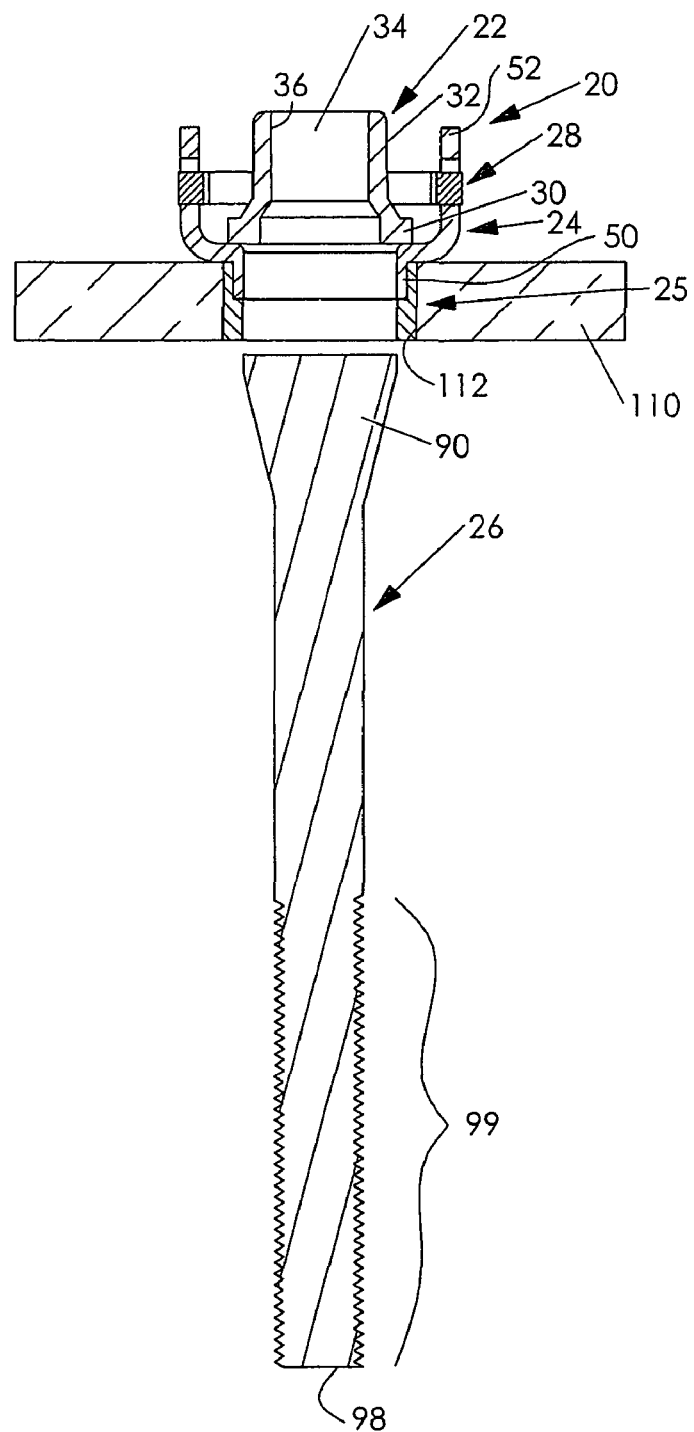
FIG. 6 is a side, cross-sectional view showing the nut plate assembly fully installed, after the head portion of the stem has been pulled completely through the sleeve of the nut plate assembly.
Figure 7:
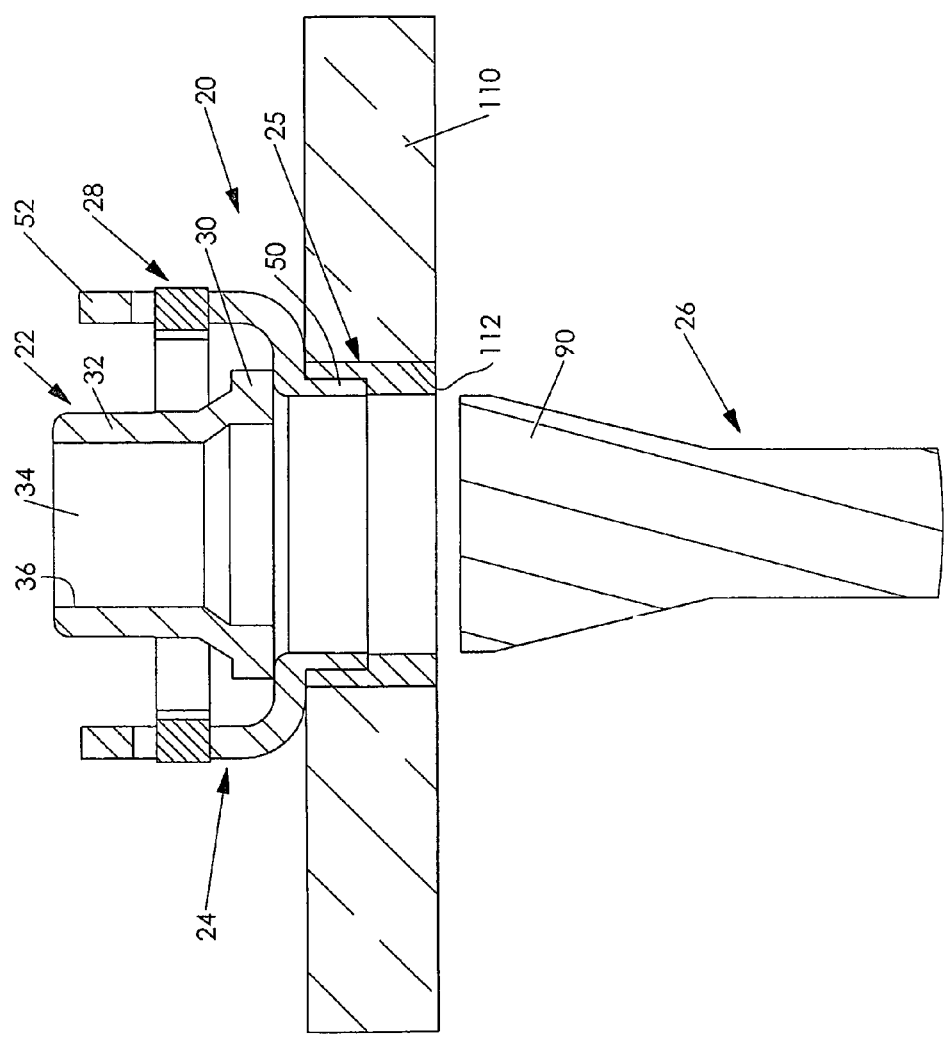
FIG. 7 is similar to FIG. 6, showing a portion thereof enlarged.
Figure 9:
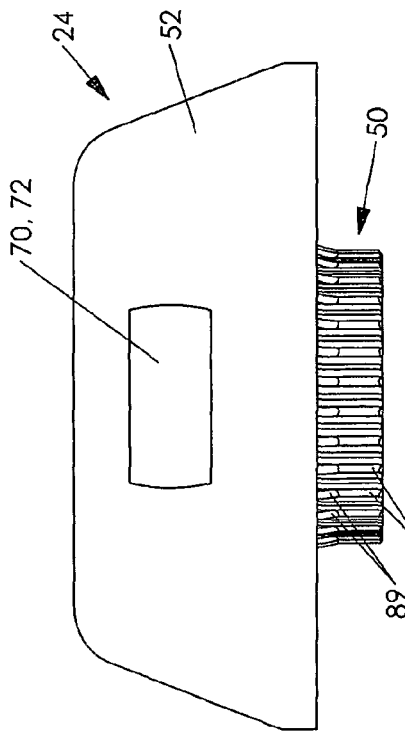
FIG. 9 is a side elevational view of the holding bracket component.
Figure 11:
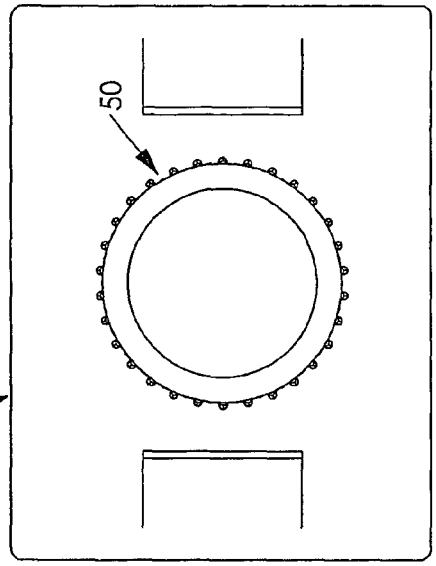
FIG. 11 is a bottom plan view of the holding bracket component.
Figure 8:
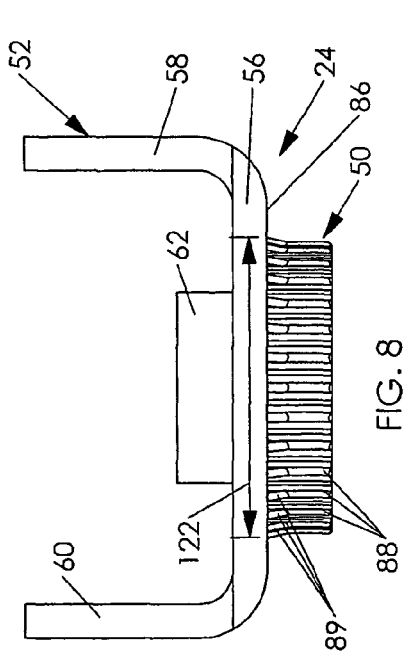
FIG. 8 is an front elevational view of a holding bracket component of the nut plate assembly.
Figure 10:
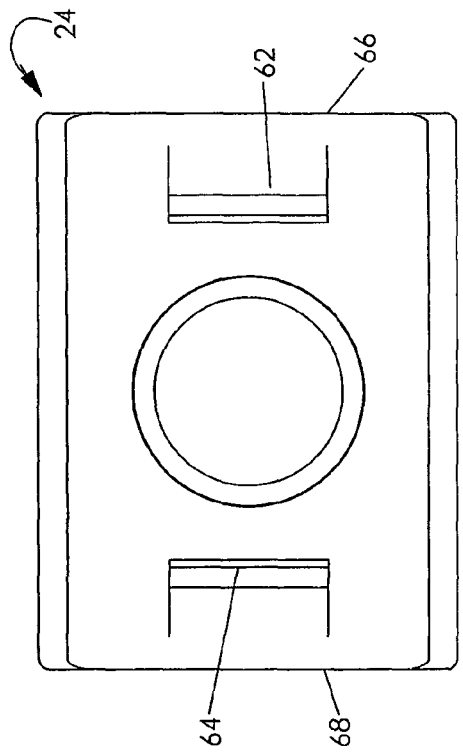
FIG. 10 is a top plan view of the holding bracket component.

When the enlarged head portion 90 is pulled completely through the aperture 74 of the tubular portion 50, as shown in FIGS. 6 and 7, the holding bracket 24 becomes effectively attached to the sleeve 25 and the sleeve 25 become effectively attached to the workpiece 110, and the stem 26 can be discarded. In addition to the holding bracket 24 being effectively attached to the sleeve 25 and the sleeve 25 being effectively attached to the workpiece 110, the nut 22 is secured within the holding bracket 24 by the retainer 28. With the nut plate 20 attached to the workpiece 110, a fastener, such as a bolt, can then be attached to the nut plate 20 and a second workpiece can be secured to the workpiece 110.

This embodiment of the present invention provides a practical means for attaching a nut plate to a composite structure without the need for satellite rivets or glue. Application of this product decreases cost due to time savings during installation, decreases the chances of a failed installation, and most importantly, a failed structure.

Figure 17:
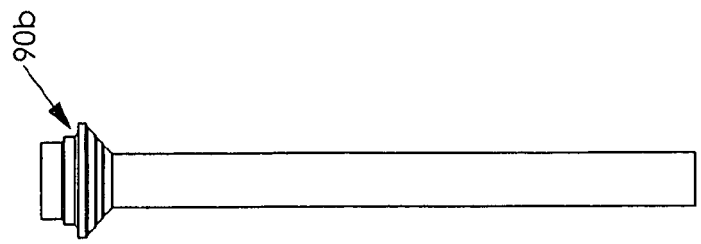
FIG. 15-17 illustrate three different mandrel head designs which can be used in association with the installation of the rivetless nut plate shown in FIG. 1.
Figure 16:
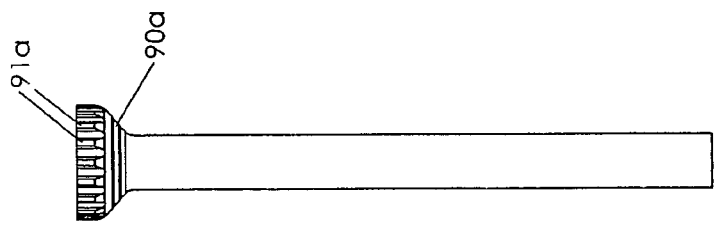

To improve performance, an alternative mandrel head design can be used. Specifically, a mandrel head 90a can be provided as being solid but having ribs 91a thereon as shown in FIG. 16, or a mandrel head 90b can be provided as being deformable as shown in FIG. 17. Both of these mandrel head designs function to enhance the interlocking action between the bracket 24, the sleeve 25, and the composite workpiece structure 110.

Figure 18:
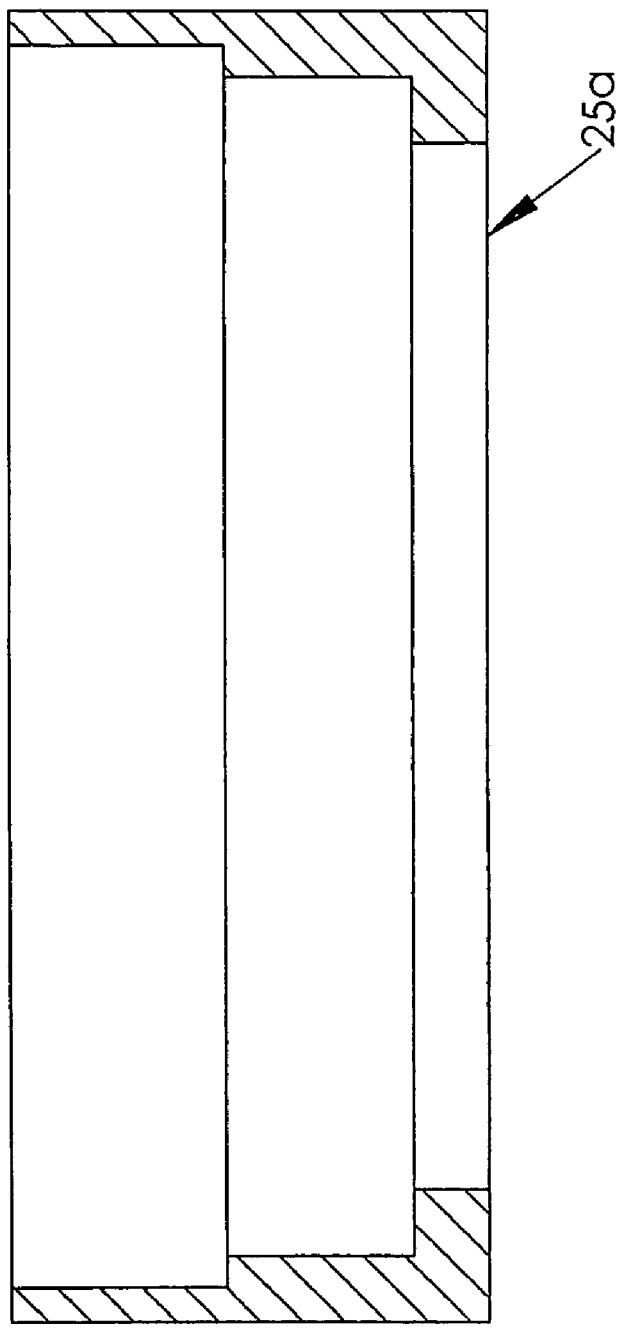
FIG. 18 is a cross-sectional view of an alternative sleeve component configuration which can be utilized in connection with the present invention.
Figure 18A:
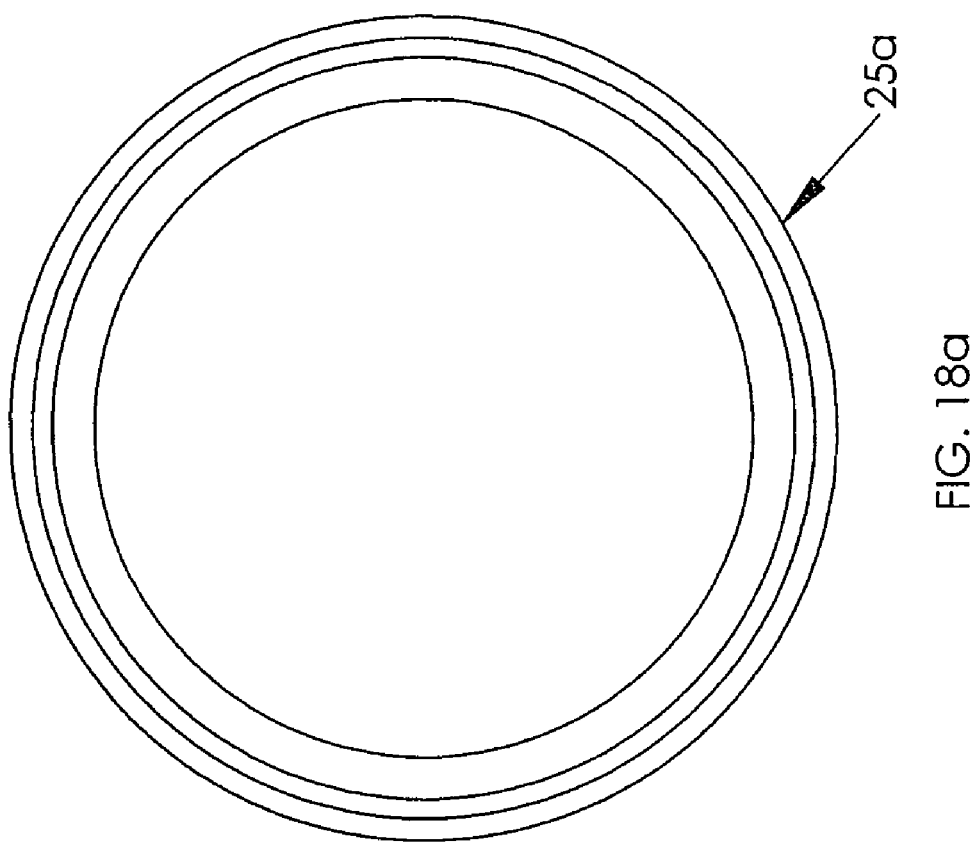
FIG. 18a is a top view of the alternative sleeve component shown in FIG. 18.
Figure 18B:
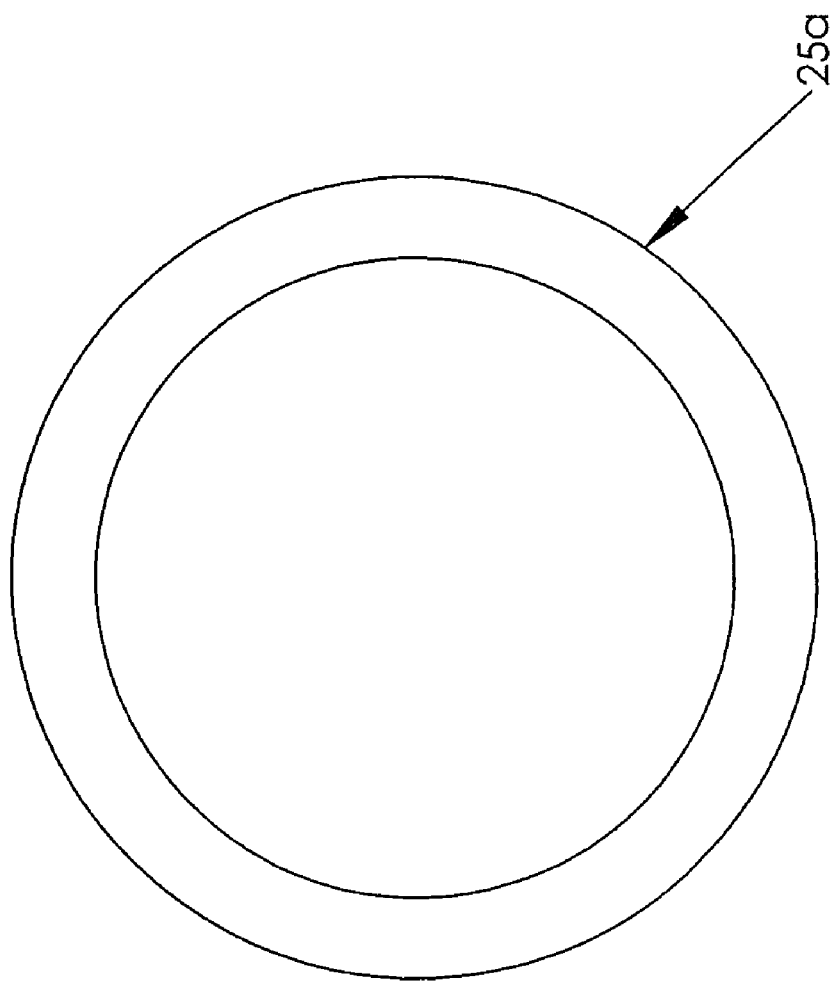
FIG. 18b is a bottom view of the alternative sleeve component shown in FIG. 18.
Figure 19:
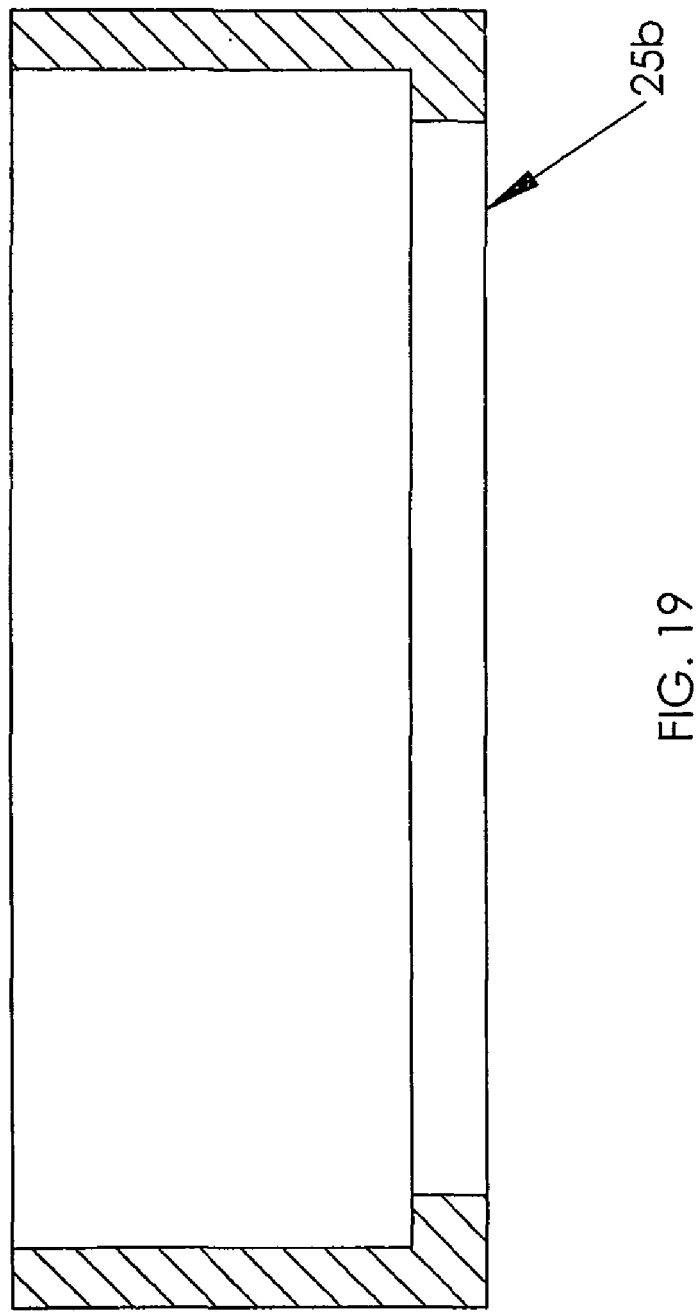
FIG. 19 is a cross-sectional view of an alternative sleeve component configuration which can be utilized in connection with the present invention.
Figure 19A:
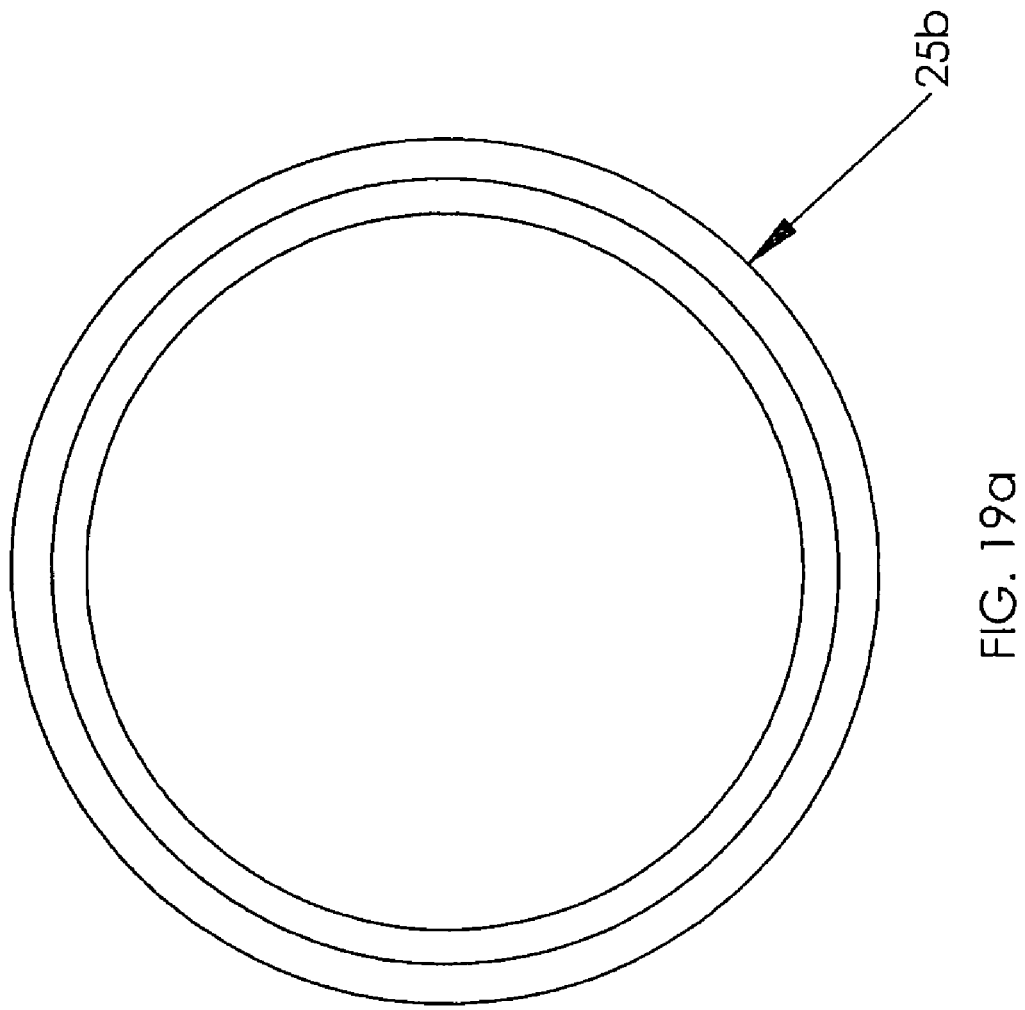
FIG. 19a is a top view of the alternative sleeve component shown in FIG. 19.
Figure 19B:
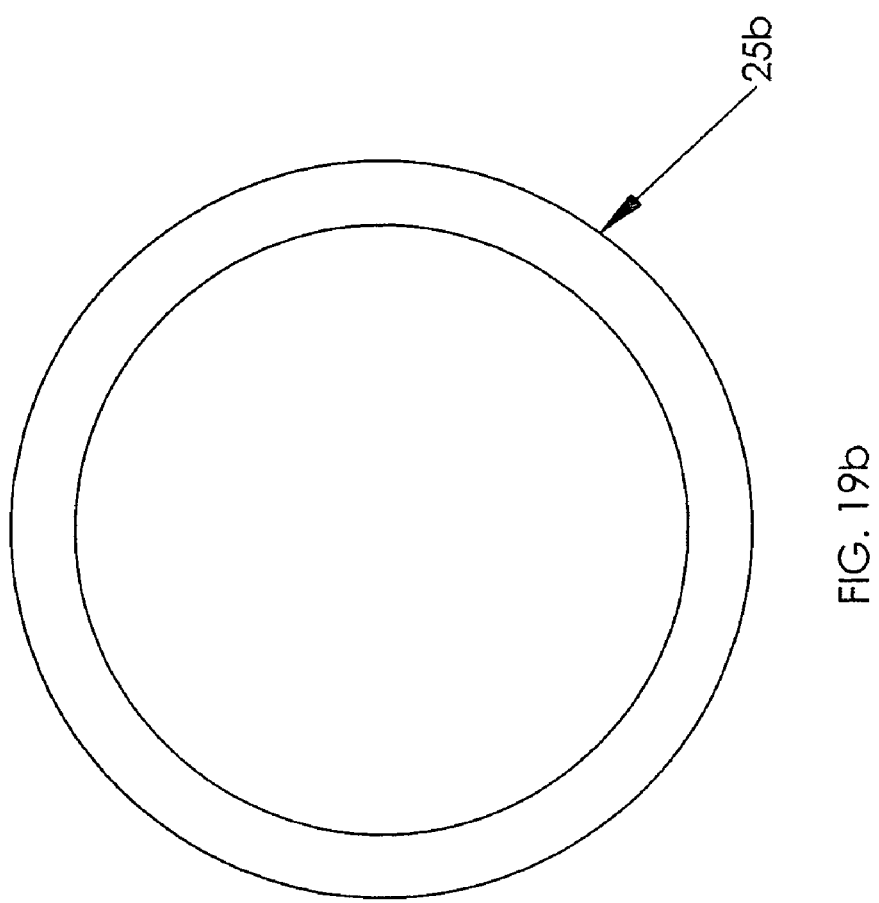
FIG. 19b is a bottom view of the alternative sleeve component shown in FIG. 19.
Figure 20:
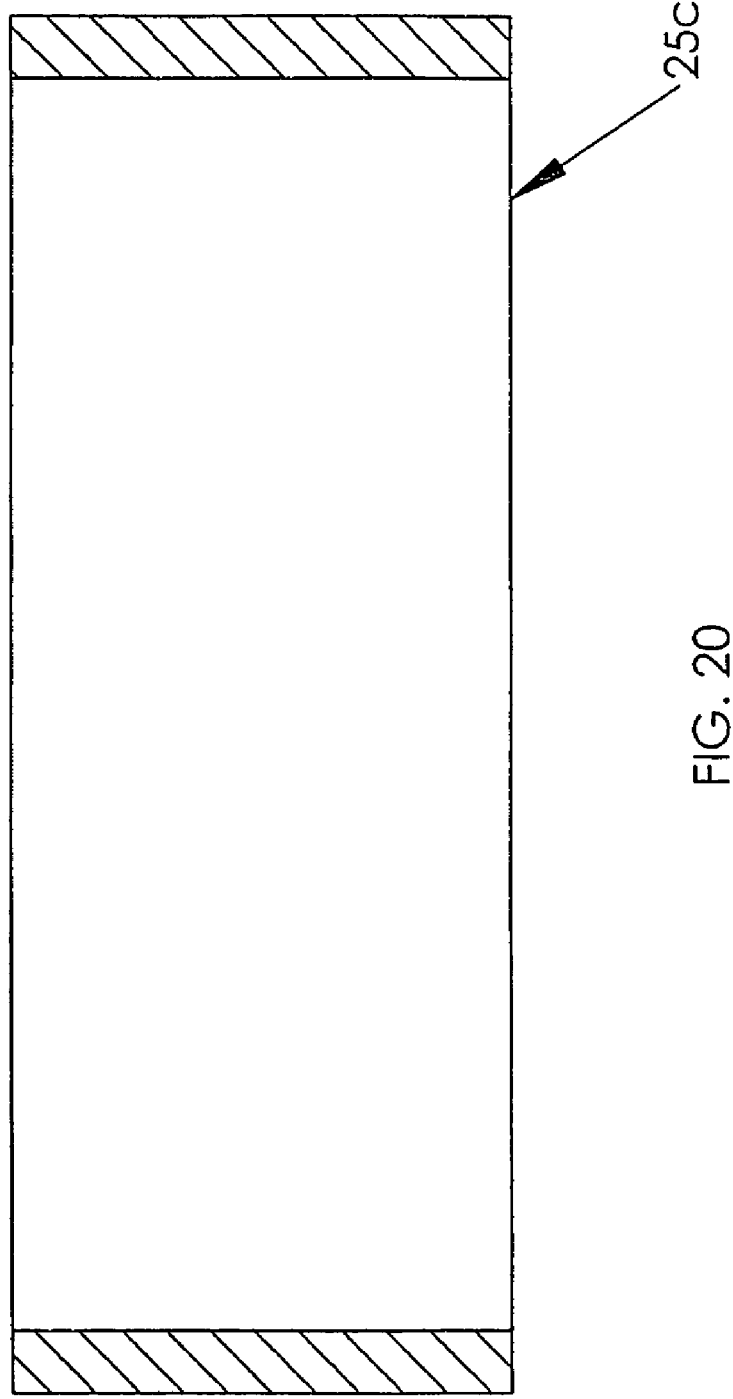
FIG. 20 is a cross-sectional view of an alternative sleeve component configuration which can be utilized in connection with the present invention.

While preferred embodiments of the rivetless nut plate assembly 20 are shown and described, it is envisioned that those skilled in the art may devise various modifications without departing from the spirit and scope of the foregoing description. For example, FIGS. 18, 19 and 20 illustrate (in side cross-section) alternative sleeve component configurations 25*a*, 25*b*, 25*c* which can be utilized (FIGS. 18*a* and 18*b* provide top and bottom views, respectively, of the alternative sleeve configuration 25*a* shown in FIG. 18, while FIGS. 19*a* and 19*b* provide top and bottom views, respectively, of the alternative sleeve configuration 25*b* shown in FIG. 19. FIG. 20*a* provides a top (and bottom) view of the alternative sleeve component 25*c* shown in FIG. 20.) Still other variations of the sleeve and other components are possible while staying within the scope of the present invention.

FIG. 21 is an exploded perspective view of a rivetless nut plate assembly 420 which is in accordance with an embodiment of the present invention. The rivetless nut plate assembly 420 is configured such that it can be installed into an aperture of a hard metal material workpiece and which can be installed without having to drill additional holes to precise tolerances.

The nut plate assembly 420 is generally identical to the nut plate assembly 20, in that it includes a nut 422, a holding bracket 424, a sleeve 425 and a retainer 428. Additionally, before installation, the nut plate assembly 420 includes a stem 426 that is used to install the nut plate assembly 420 into an aperture 512 in a hard metal material workpiece 510.

The nut 422, the holding bracket 424, the stem 426 and the retainer 428 are identical in their individual configurations, and in their interaction with one another, as the nut 22, the holding bracket 24, the stem 26 and the retainer 28 and, therefore, the description of same will not again be described herein for brevity purposes.

The sleeve member 425 is preferably formed of a material, such as Titanium Columbium, Monel or soft Nickel or soft Titanium alloys. These materials are preferred because they have corrosion resistant properties with titanium and stainless alloys and have the necessary ductility required for adequate deformation to engage with the hard metal material workpiece 510. Other materials with similar corrosion resistant properties and ductility could also be used to form the sleeve member 425. The sleeve member 425 allows the installation of the rivetless nut plate assembly 420 into hard metal structures, namely those having a hardness of 25 Rc and above, for example Titanium and Steel alloys, in such a way that the mechanical properties of the installed rivetless nut plate conforms with NASM25027 for torque out and push out. The sleeve member 425 is necessary because otherwise, the outer lobe members 88, 89 of the retainer sleeve member 50 would improperly deform during installation, instead of embedding into the workpiece material.

Figure 22:
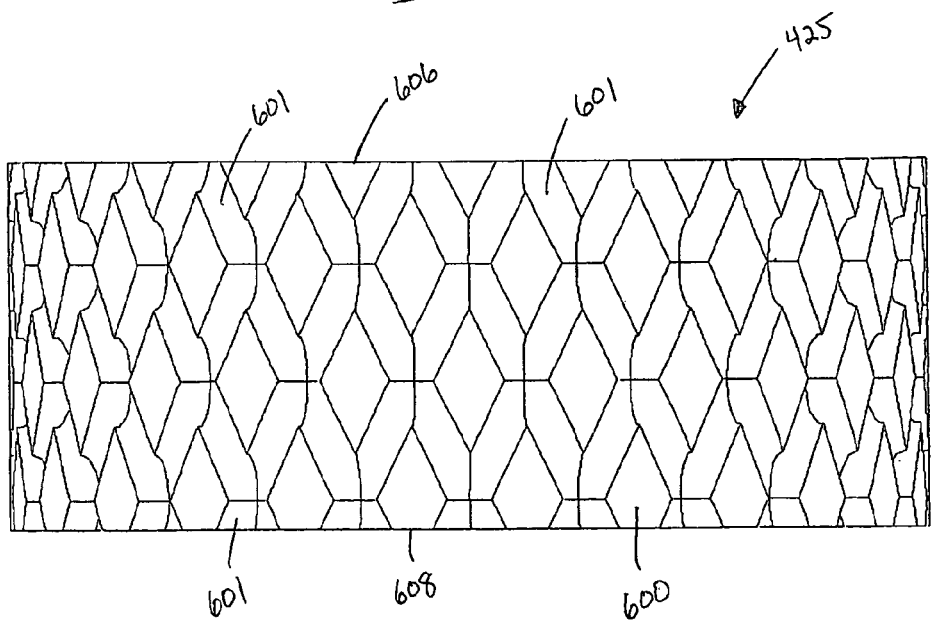
FIG. 22 is a side elevational view of a sleeve member of the nut plate assembly provided in FIG. 21.
Figure 23:
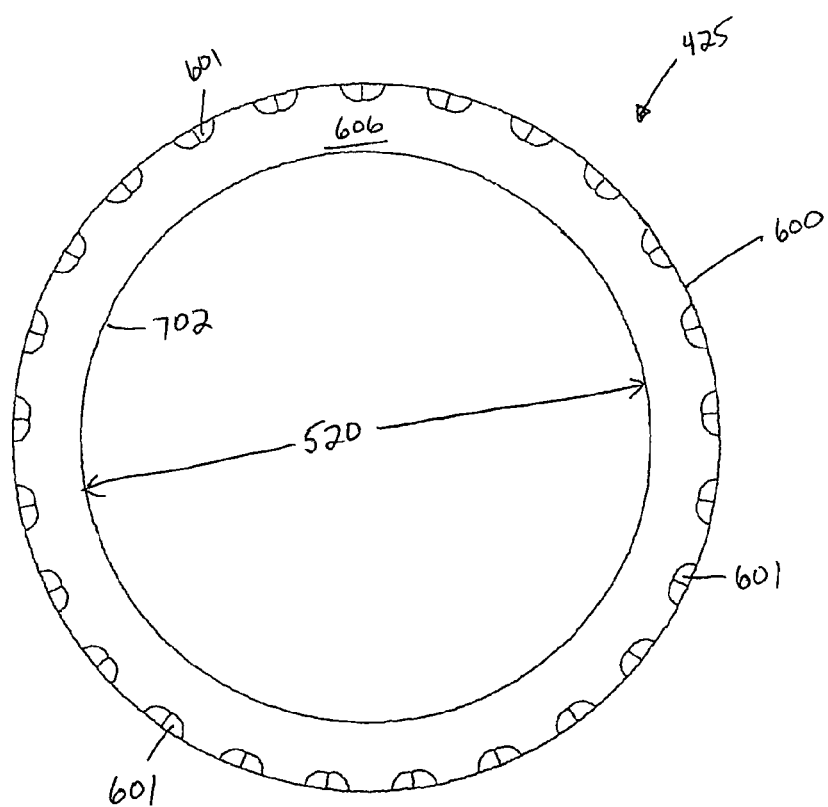
FIG. 23 is a top view of the sleeve member shown in FIG. 22.

The sleeve member 425 has an outer diameter/surface 600 that is preferably slightly larger than the aperture 512 to be drilled into the hard metal structure 510. The outer diameter/surface 600 is preferably larger than the aperture 512 in order to provide an interference fit, and thus better push out and torque out properties. While the outer diameter 600 is typically smooth (see FIGS. 1, 12*a* and 18-20) or tapered (see FIGS. 12-14), if desired, this outer diameter 600 can be impressed in order to provide any one of several knurling patterns, including, but not limited to, a diamond knurling pattern 601 as best illustrated in FIGS. 21-23, a vertical striation knurling pattern (not shown), or a horizontal striation knurling pattern (not shown). The knurling patterns 601 help make impressions in the hard metal material workpiece 510, thus improving push out and torque out. The knurling patterns 601 also provide room for expansion and deformation of the sleeve member 425 during installation.

The sleeve member 425 also preferably has a length, defined as a distance from the top 606 of the sleeve member 425 to the bottom 608 of the sleeve member 425, which is substantially equal to a thickness of the workpiece 510, defined as a distance (dimension 609 in FIG. 24) from the top surface 514 to the bottom surface 516 of the workpiece 510. While the length of the tubular portion 50 of the holding bracket 424 is preferably equal to or less than the thickness of the workpiece 510, the length of the sleeve member 425 is preferably equal to or greater than the length of the tubular portion 50 of the holding bracket 424.

Preferably, the sleeve member 425 is shaped such that it can be press fit onto the holding bracket 424, i.e., onto the lobes 88. As such, an inner diameter 520 (see FIG. 23) of the sleeve member 425 is preferably uniform throughout the length of the sleeve member 425 and is preferably slightly less than an outer diameter 522 (see FIG. 8) of the tubular portion 50 of the holding bracket 424. The geometry of the inner diameter 520 of the sleeve member 425 serves to interact with and become the embedding material for the lobes 88, 89 as well as, when necessary, interacts with the stem to provide further radial expansion within the aperture. If more pressure is required between the sleeve member 425 and the workpiece, a stepped or tapered inner diameter 520 may be provided.

In use, a hole or aperture 512 of a standard specified size is drilled into the hard metal structure 510 at the point where the rivetless nut plate 420 is needed; no additional operations are required on the aperture 512. Then, the sleeve member 425 is pressed onto the holding bracket 424, the stem 426 is positioned such that the head 90 of the stem 426 is in contact with the shoulder 80 of the holding bracket 424, and the elongated portion 94 extends through the aperture 74 in the tubular portion 50 of the holding bracket 424. Then, the nut 422 is placed on the holding bracket 424, and the retainer 428 is used to secure the nut 422 against the holding bracket 424 and effectively secure the head 90 of the stem 426 in the holding bracket 424.

Figure 24:
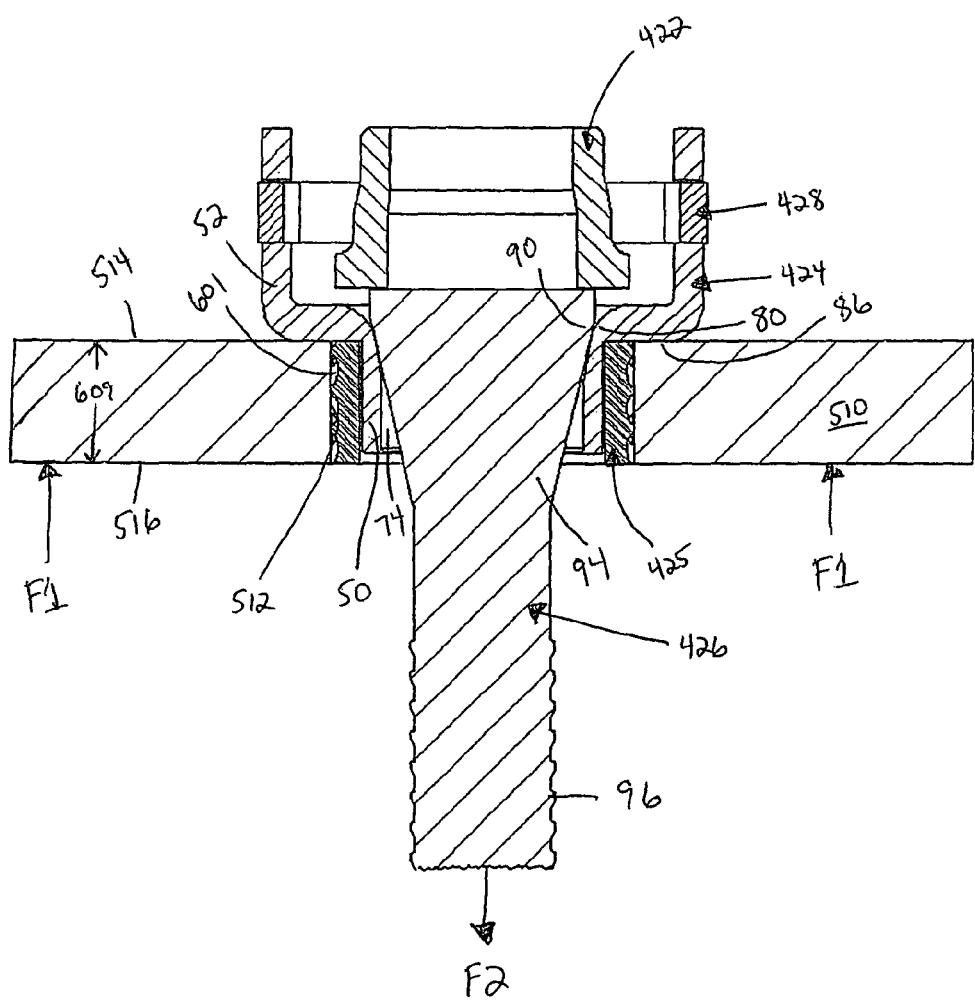
FIG. 24 is an enlarged side, cross-sectional view showing the nut plate assembly of FIG. 21 positioned for installation in a hole in a hard metal material workpiece.

The nut plate assembly 420, in its preassembled form, is then inserted into the aperture 512 of the workpiece 510 by inserting the second end 98 of the stem 426 and the tubular portion 50 of the holding bracket 424 and the sleeve member 425 into the aperture 512 of the workpiece 510, such that the undersurface 86 of the bracket portion 52 of the holding bracket 424 sits on the top surface 514 of the workpiece 510, as illustrated in FIG. 24. The aperture 512 has a depth (dimension 609 in FIG. 24) which is preferably larger than or equal to the length of the tubular portion 50 of the holding bracket 424 such that the tubular portion 50 does not extend beyond the aperture 512 of the workpiece 510.

Figure 22A:
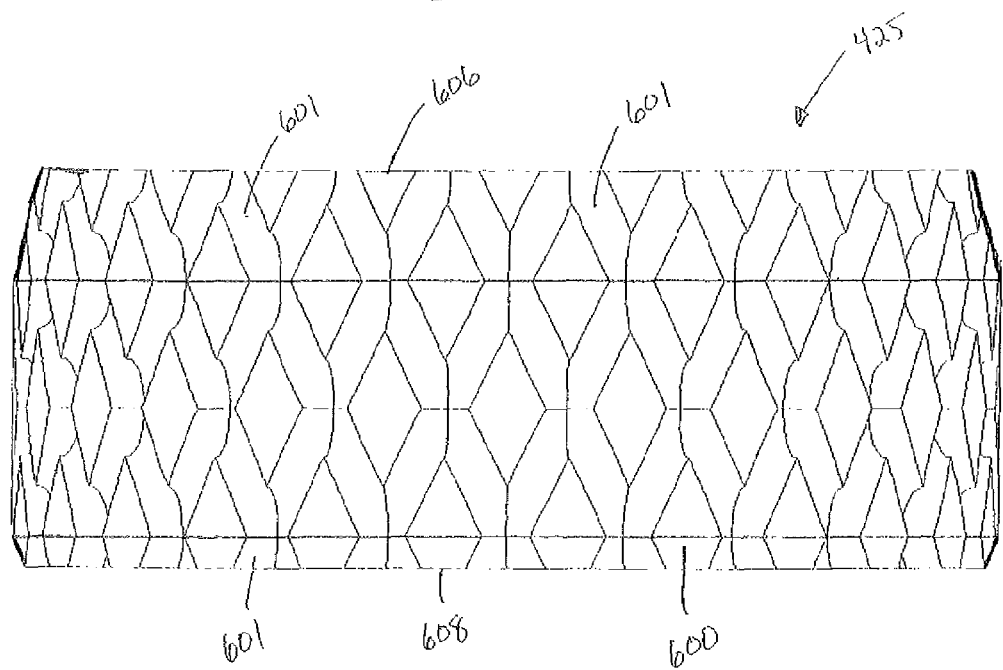
FIG. 22a is a side elevational view of a sleeve member of the nut plate assembly provided in FIG. 21 where the outside surface of the sleeve member is tapered.
Figure 23:
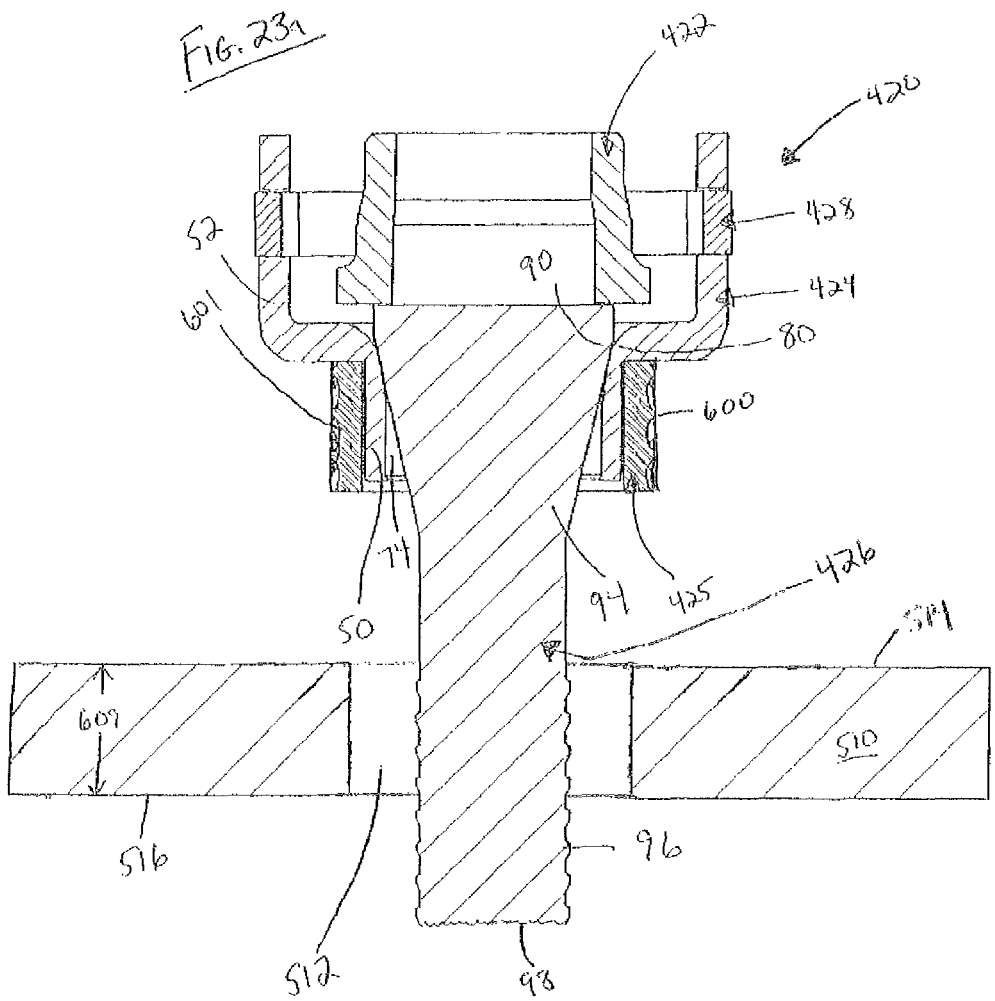

In some instances, the outer diameter of the sleeve member 425 may be slightly larger than the diameter of the aperture 512 (see FIG. 23*a* for example). Installation for this type of sleeve member 425 would further require a minor load applied upon insertion of the nut plate assembly 420 into the aperture 512 of the workpiece 510. A determination of whether the outer diameter of the sleeve member 425 is larger or smaller than the diameter of the aperture 512 typically depends on the radial forces required for push-out and torque-out of the product after installation. The larger outer diameter of the sleeve member 425 may require a taper as illustrated in FIG. 22*a*, similar to that as illustrated in FIG. 12.

Figure 25:
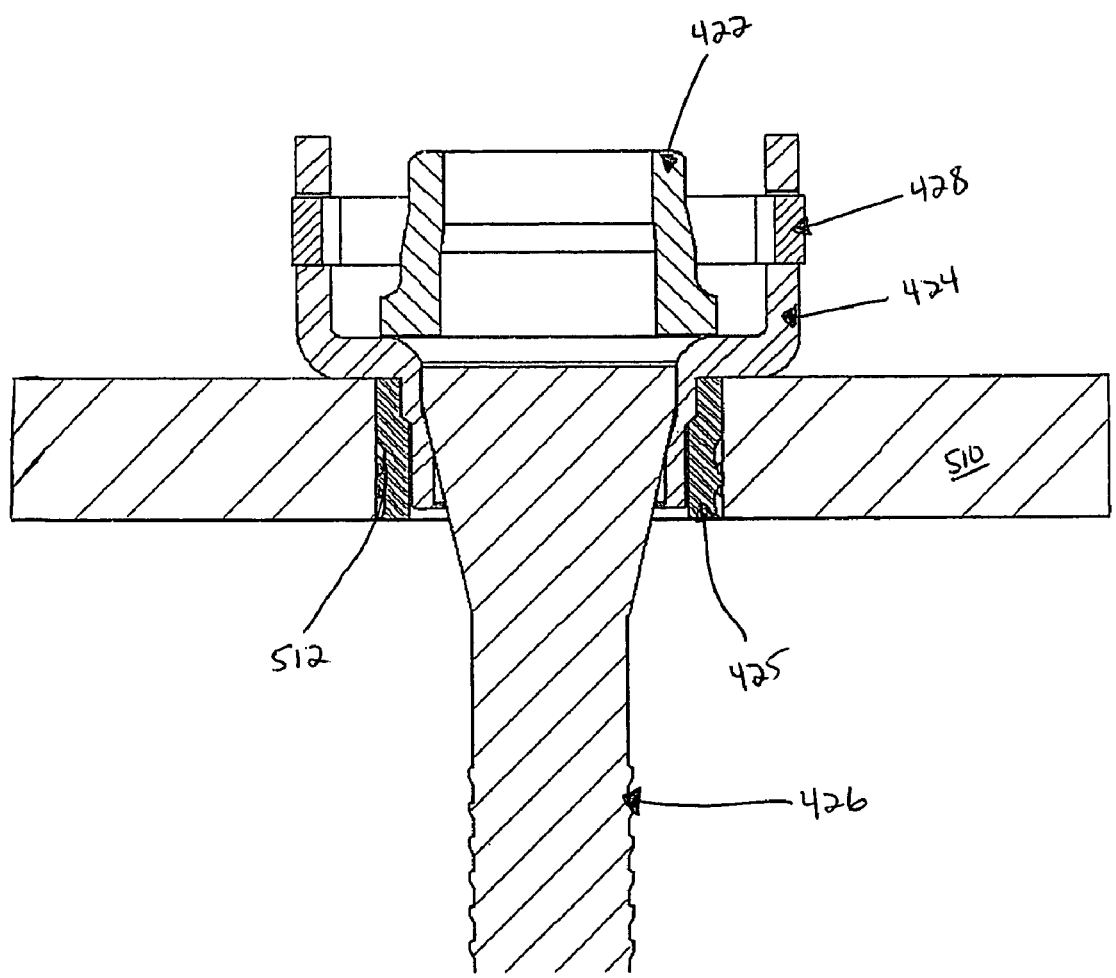
FIG. 25 is an enlarged side, cross-sectional view showing a head portion of a stem being pulled through the sleeve member of the nut plate assembly of FIG. 21.

Through the use of a pulling tool, a holding or abutment force F1 (see FIG. 24) is applied to the bottom surface 516 of the workpiece 510 and the tool engages the tool engaging section 96 of the stem 426 and applies a force F2 (see FIG. 24) to the stem 426 which is directed axially and in the opposite direction than the force F1 is applied to the workpiece 510. The force F2 on the stem 426 seats the tubular portion 50 and the bracket portion 52 of the holding bracket 424 firmly against and within the sleeve 425, as shown in FIGS. 24-26, such that the sleeve member 425 and the tubular portion 50 of the holding bracket 424 are pulled into a press fit with the workpiece 510.

Through the use of the pulling tool, the head 90 of the stem 426 is pulled through the tubular portion 50 of the holding bracket 424, expanding both the tubular portion 50 of the holding bracket 424 and the sleeve member 425, creating interference between the holding bracket 424 and the sleeve member 425, as well as interference between the sleeve member 425 and the hard metal material workpiece 510. This radial expansion and resulting interference creates the interlocking and interference necessary to obtain the required mechanical properties for the rivetless nut plate 420. The sleeve member 425 is pliable/ductile to interlock with the tubular portion 50 of the holding bracket 424 and to create the necessary interference load with the hard metal structure 510 from this radial expansion. The knurling pattern 601 on the outer diameter 600 of the sleeve member 425, if provided, will assist and/or enhance the interlocking and interference necessary to obtain the required mechanical properties for the rivetless nut plate 420.

The enlarged head portion 90 of the stem 426 initially expands the tubular portion 50 as well as places a compressive load on the components to seat them against the top surface 514 of the workpiece 510. The tubular portion 50 expands to engage the sleeve member 425. As this occurs, the head 90 of the stem 426 continuously deforms the tubular portion 50 radially outwardly to engage the sleeve member 425 with sufficient force to cause the lobes/ribs 88, or alternate structure, if provided on the outer wall 78 of the tubular portion 50 to embed in the interior wall 702 of the sleeve member 425. As can be appreciated, the increasing wall thickness of the tubular portion 50 insures that radial deformation continues along the entire length of the tubular portion 50 to attain the desired degree of engagement of the lobes/ribs 88 in the wall 702 of the sleeve member 425 such that improved push-out, pull-out, torque-out and fatigue characteristics are achieved.

Figure 26:
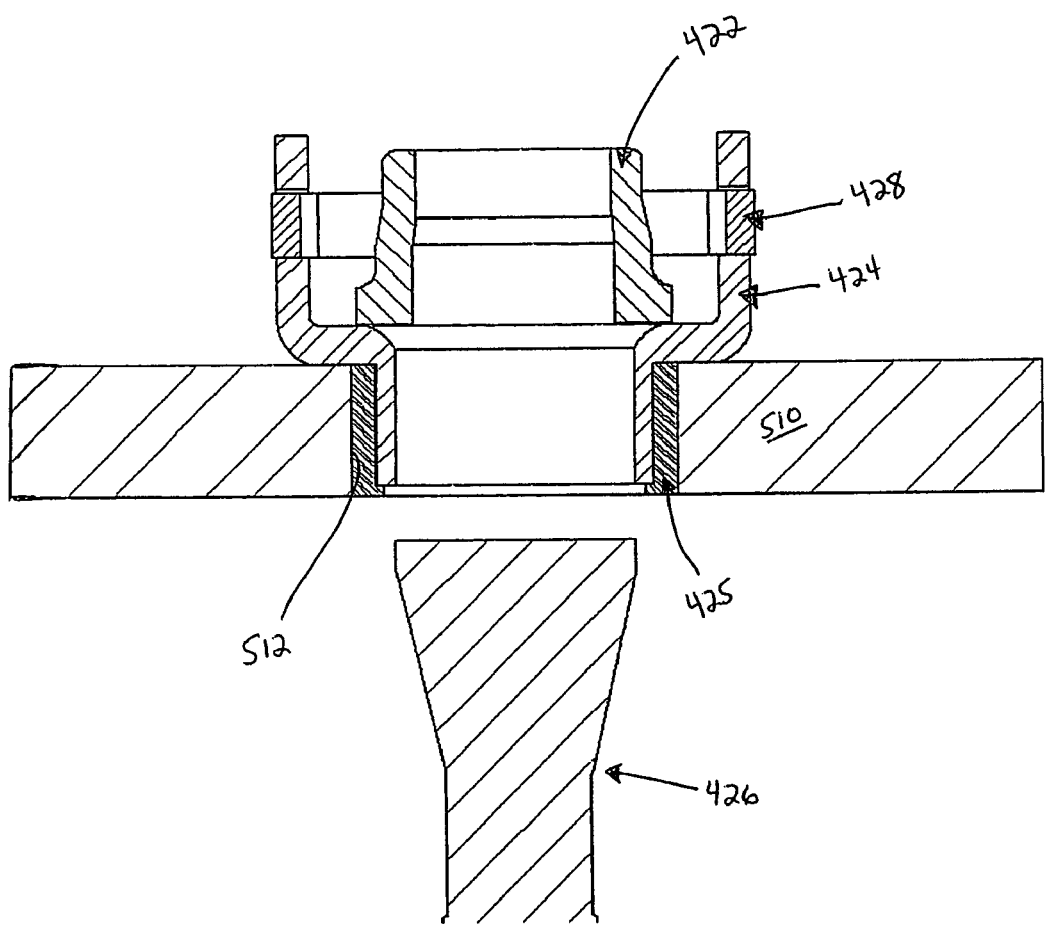
FIG. 26 is an enlarged side, cross-sectional view showing the nut plate assembly of FIG. 21 fully installed, after the head portion of the stem has been pulled completely through the sleeve member of the nut plate assembly.

When the enlarged head portion 90 is pulled completely through the aperture 74 of the tubular portion 50, as shown in FIG. 26, the holding bracket 424 becomes effectively attached to the sleeve member 425 and the sleeve member 425 becomes effectively attached to the workpiece 510, and the stem 426 can be discarded. In addition to the holding bracket 424 being effectively attached to the sleeve member 425 and the sleeve member 425 being effectively attached to the workpiece 510, the nut 422 is secured within the holding bracket 424 by the retainer 428. With the nut plate 420 attached to the workpiece 510, a fastener, such as a bolt, can then be attached to the nut plate 420 and a second workpiece can be secured to the workpiece 510.

This embodiment of the present invention provides a practical means for attaching a nut plate to a hard metal structure without the need for satellite rivets. Another important advantage of this embodiment of the invention is the ability to the consumer to use a rivetless nut plate within hard metal structures. Application of the rivetless nut plate assembly 420 will cut down cost due to time savings during installation, decrease the chances of a failed installation, and will require less skill to install. It has been determined that the application of the rivetless nut plate assembly 420 can save up to three minutes time per nut plate as compared to the old nut plate with satellite rivets.

As with the rivetless nut plate assembly 20, the rivetless nut plate assembly 420 may include stems 426 having alternative mandrel head designs so long as the mandrel head designs function to provide, or possibly even enhance, the interlocking action between the holding bracket 424, the sleeve member 425, and the hard metal workpiece structure 510.

While preferred embodiments of the rivetless nut plate assembly 420 are shown and described, it is envisioned that those skilled in the art may devise various modifications without departing from the spirit and scope of the foregoing description. For example, alternative sleeve component configurations, such as those illustrated in FIGS. 18, 19 and 20 with regard to the rivetless nut plate assembly 20 can be utilized. Still other variations of the sleeve and other components are possible while staying within the scope of the present invention.

What is claimed is:

1. A combination comprising:
   a hard metal material workpiece having a hardness of at least 25 Rc, said hard metal material workpiece having an aperture which defines an aperture wall having a first diameter; and
   a rivetless nut plate assembly which is configured for installation into said aperture of said hard metal material workpiece, said installation being effected by pulling a stem through said rivetless nut plate assembly, said rivetless nut plate assembly comprising:
   a nut;
   a holding bracket, wherein the holding bracket is generally Y-shaped and comprises a tubular portion which extends into the aperture of the workpiece and a bracket portion which extends outwardly from the tubular portion;
   a retainer which engages the bracket portion of the holding bracket and retains the nut on the holding bracket; and
   a sleeve member having an outside surface which has a second diameter, said second diameter of the sleeve member being slightly larger than said first diameter of the aperture wall, said sleeve member being positioned around the tubular portion of the holding bracket, wherein the sleeve is made of at least one of Titanium Columbium, Monel, a soft Nickel alloy and a soft Titanium alloy, said sleeve member configured to engage the aperture wall in an interference fit prior to the pulling of the stem through the assembly and, thereafter, to be radially expanded upon the pulling of the stem through the assembly.

2. The combination as recited in claim 1, wherein said outside surface of the sleeve member is tapered.

3. The combination as recited in claim 1, wherein the hard metal material workpiece is made out of at least one of a Titanium alloy and a Steel alloy.

4. The combination as recited in claim 1, wherein said outside surface of the sleeve member is smooth.

5. The combination as recited in claim 1, wherein said outside surface of the sleeve member has a knurling pattern impressed thereinto.

* * * * *